US009042881B2

(12) United States Patent
Kwon et al.

(10) Patent No.: US 9,042,881 B2
(45) Date of Patent: May 26, 2015

(54) APPARATUS AND METHOD FOR REPORTING RADIO LINK FAILURE

(75) Inventors: Ki Bum Kwon, Seoul (KR); Jae Hyun Ahn, Seoul (KR); Myung Cheul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 423 days.

(21) Appl. No.: 13/457,183

(22) Filed: Apr. 26, 2012

(65) Prior Publication Data

US 2012/0276897 A1    Nov. 1, 2012

(30) Foreign Application Priority Data

Apr. 27, 2011 (KR) .................. 10-2011-0039647

(51) Int. Cl.
H04W 24/00 (2009.01)
H04B 1/10 (2006.01)
H04B 15/02 (2006.01)
H04W 24/10 (2009.01)

(52) U.S. Cl.
CPC .............. H04B 1/1027 (2013.01); H04B 15/02 (2013.01); H04W 24/10 (2013.01)

(58) Field of Classification Search
CPC .............. H04W 88/06; H04W 72/082; H04W 72/1215; H04W 16/14; H04W 36/20; H04W 72/0413; H04W 24/10; H04W 52/244; H04W 72/0406; H04B 15/00; H04B 1/1027; H04B 15/02
USPC ............. 455/423, 63.1–65, 67.11–67.7, 455/114.1–115.4, 226.1–226.4; 370/242–245, 252, 253

See application file for complete search history.

(56) References Cited

U.S. PATENT DOCUMENTS

| 2009/0257353 A1* | 10/2009 | Song et al. ................. 370/241 |
| 2012/0040715 A1* | 2/2012 | Fu et al. ................. 455/553.1 |
| 2012/0207040 A1* | 8/2012 | Comsa et al. ............. 370/252 |
| 2013/0294281 A1* | 11/2013 | Lee et al. .................. 370/252 |

FOREIGN PATENT DOCUMENTS

WO    2010/087625    8/2010

OTHER PUBLICATIONS

3GPP TR 36.816, v1.3.0, "Technical Report 3rd Generation Partnership Project; Technical Specification Group Radio Access Networks; Evolved Universal Terrestrial Radio Access (E-UTRA); Study on signalling and procedure for interference avoidance for in-device coexistence; (Release 10)," Apr. 24, 2011.

(Continued)

Primary Examiner — Allahyar Kasraian
(74) Attorney, Agent, or Firm — H.C. Park & Associates, PLC

(57) ABSTRACT

The present invention relates to an apparatus and method for report a Radio Link Failure (RLF) and discloses the operations of UE or an eNB and the operating schemes of a network according to a cause of RLF. More specifically, the operating efficiency of a network is improved by reporting the reception power or interference power or both of other transceivers within a device, from among causes that generate RLF. This specification includes elements for configuring detecting RLF, configuring an RLF report on the RLF, and transmitting the RLF report. The RLF report includes information about whether there was an influence of In-device COexistence interference (ICO) to the RLF.

18 Claims, 16 Drawing Sheets

(56) References Cited

OTHER PUBLICATIONS

LG Electronics Inc., "Possible Solutions for In-device Interference Avoidance," R2-104880, 3GPP TSG-RAN2 Meeting #71 Madrid, Spain, Aug. 23-27, 2010.

Baghel, S.K. et al. "Coexistence possibilities of LTE with ISM technologies and GNSS," Communications (NCC), 2011 National Conference, Jan. 28-30, 2011.

International Search Report Issued for International Application No. PCT/KR2012/003252 dated Nov. 28, 2012.

CMCC, "Discussion on moving LTE signal away from ISM band for in-device coexistence", 3GPP TSG-RAN WG2 Meeting #71bis, R2-105673, Oct. 11-15, 2010, China.

MediaTek(Email Discussion Rapporteur), "Email discussion on information from UE for FDM solution", 3GPP TSG-RAN WG2 Meeting #72, R2-106291, Oct. 15-19, 2010, USA.

ZTE, "Considerations on the detail procedure for FDM approach", 3GPP TSG-RAN WG2 Meeting #72bis, R2-110243, Jan. 17-21, 2011, Dublin, Ireland.

\* cited by examiner

APPARATUS AND METHOD FOR REPORTING RADIO LINK FAILURE

CROSS-REFERENCE TO RELATED APPLICATIONS

This application claims the benefit of priority of Korean Patent Application No. 10-2011-0039647 filed on Apr. 27, 2011, all of which is incorporated by reference in its entirety herein.

BACKGROUND OF THE INVENTION

1. Field of the Invention

The present invention relates to wireless communication and, more particularly, to an apparatus and method for reporting Radio Link Failure (RLF).

2. Discussion of the Related Art

In general, a wireless communication system uses one bandwidth in order to transmit data. For example, the $2^{nd}$ generation wireless communication system uses a bandwidth of 200 KHz to 1.25 MHz, and the $3^{rd}$ generation wireless communication system uses a bandwidth of 5 MHz to 10 MHz. In order to support an increased transmission capacity, the recent bandwidth of the $3^{rd}$ Generation Partnership Project (3GPP) Long Term Evolution (LTE) or IEEE 802.16m is extending up to 20 MHz or higher.

Meanwhile, in the prior art where one terminal performs communication with one network system, a user had to carry different devices supporting respective network systems. Users can access the same network in different areas and also access different networks in the same area with the help of the recent ubiquitous access network. In order to support such access, the function of a terminal has been highly developed and complicated, and communication has been able to be performed using even one terminal by accessing a number of network systems. Accordingly, there are advantages in that user convenience has been increased and the bandwidth is effectively utilized.

However, there is a problem in that the performance of a wireless communication system is deteriorated owing to interference due to the transceivers of different communication systems. Accordingly, there is a need to solve a reduction in the performance of a wireless communication system.

SUMMARY OF THE INVENTION

An object of the present invention is to provide an apparatus and method for reporting information about the cause of RLF in a wireless communication system.

Another object of the present invention is to provide an apparatus and method for improving network quality by obtaining RLF information in a wireless communication system.

Yet another object of the present invention is to provide an apparatus and method for configuring an RLF report according to the cause of RLF in a wireless communication system.

Still yet another object of the present invention is to provide an apparatus and method for reporting RLF information occurring due to interference resulting from different communication devices within a terminal in a wireless communication system.

Yet another object of the present invention is to provide an apparatus and method for reporting RLF information, including measured values of reception power and/or interference power of signals resulting from the transceivers of different communication systems within a terminal, in a wireless communication system.

An embodiment of the present invention relates to a method of User Equipment (UE) reporting Radio Link Failure (RLF), including configuring an RLF report on the RLF and transmitting the RLF report to an eNodeB (eNB), wherein the RLF report comprises information about whether there was an influence of In-device COexistence interference (ICO) to the RLF.

Here, the RLF report may include information indicating a communication system which generated the ICO.

Furthermore, the RLF report may include information indicating a measured value of the reception power or interference power of a second communication system signal within the UE where the RLF was generated to a first communication system within the UE.

Here, the reception power of the second communication system signal to the first communication system is measured using a measurement method of the first communication system within a band used by the first communication system. The interference power of the second communication system signal to the first communication system indicates a value of the reception power of the second communication system signal to reception power of all signals received within a band used by the first communication system, which is measured using a measurement method of the first communication system.

Meanwhile, the RLF report may be included in a Radio Resource Control (RRC) connection re-establishment request message and then transmitted, in an RRC connection re-establishment procedure performed after the RLF and may be transmitted as a response to a UE information request received from an Evolved-Universal Terrestrial Radio Access Network (E-UTRAN).

Another embodiment of the present invention relates to a method of an eNB processing an RLF report, including receiving an RLF report and transmitting information about RLF to a cell where the RLF has occurred, wherein the cell where the RLF has occurred is determined based on the RLF report.

If the RLF report includes ICO information about UE regarding the RLF, the ICO information of the UE may be transmitted only when a cell where RLF has occurred requires information about ICO.

The RLF report may be included in a Radio Resource Control (RRC) connection re-establishment request message received from the UE where the RLF was generated and then transmitted. The RLF report may be transmitted as a response to a UE information request received from an Evolved-Universal Terrestrial Radio Access Network (E-UTRAN). The information about the RLF may be transmitted through an X2 interface.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Figure 1:
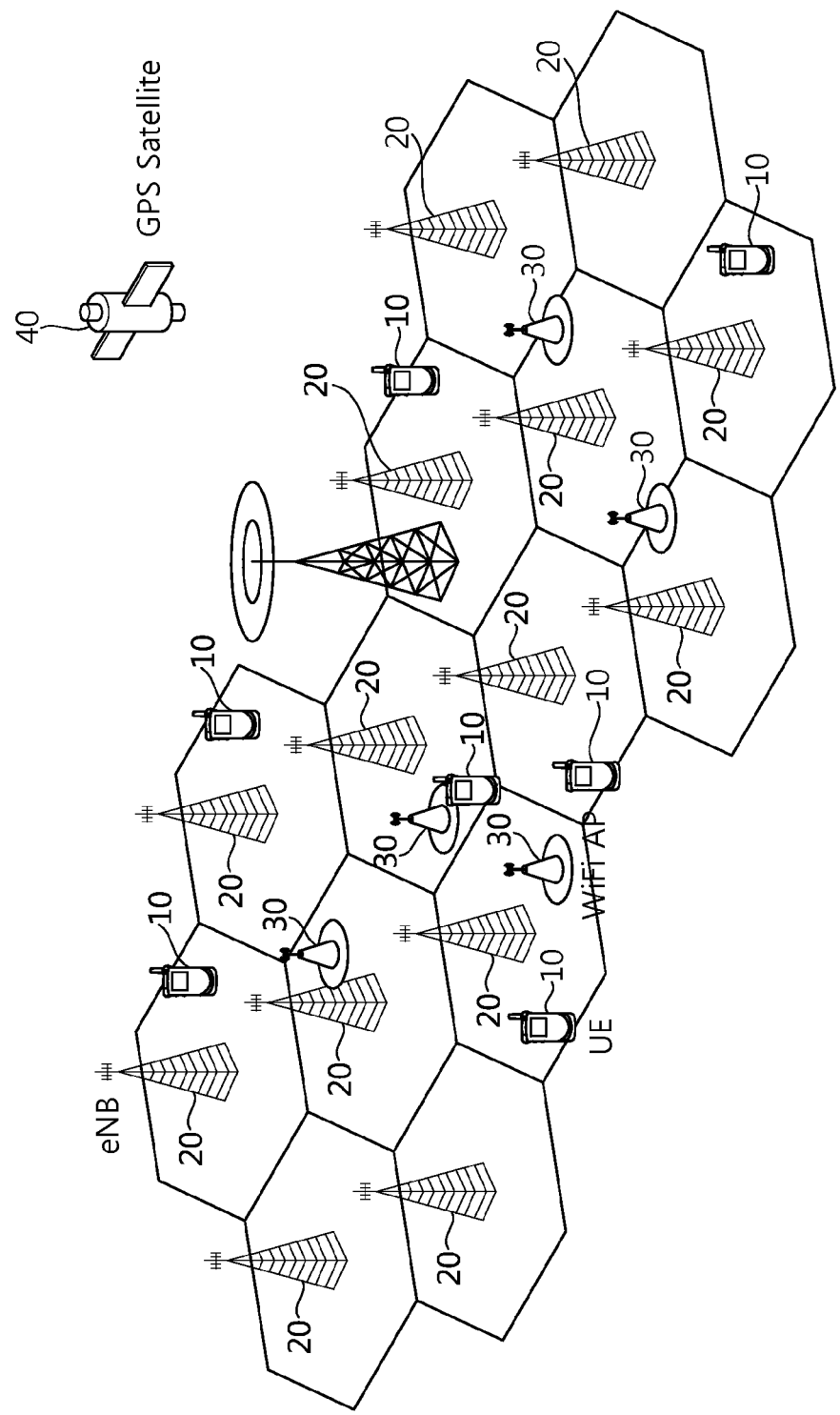
FIG. 1 shows a wireless communication system to which embodiments of the present invention are applied.

Hereinafter, in this specification, some exemplary embodiments are described in detail with reference to the accompanying drawings. It is to be noted that in assigning reference numerals to elements in the drawings, the same reference numerals designate the same elements throughout the drawings although the elements are shown in different drawings. Furthermore, in describing the embodiments of the present invention, a detailed description of the known functions and constructions will be omitted if it is deemed to make the gist of the present invention unnecessarily vague This specification is focused on a wireless communication network. Tasks performed in the wireless communication network may be performed in a process in which a system (e.g., a eNodeB) managing the wireless communication network controls the wireless communication network and sending data or may be performed in user equipment associated with the wireless communication network.

FIG. 1 shows a wireless communication system to which embodiments of the present invention are applied.

Referring to FIG. 1, a plurality of the wireless communication systems is widely deployed in order to provide a variety of communication services, such as voice and packet data.

The wireless communication system includes User Equipments (UEs) 10, evolved NodeBs (eNBs) 20, Wireless LAN (WLAN) Access Points (APs) 30, and Global Positioning Systems (GPSs) (40) satellites. Here, a WLAN is an apparatus supporting IEEE 802.11 technology, that is, a wireless standard. IEEE 802.11 may also be called a Wi-Fi system.

The UE 10 may be placed in the coverages of a number of networks, such as a cellular network, a WLAN, a broadcast network, and a satellite system. In order for the UE 10 to access a variety of networks, such as the eNB 20, the WLAN AP 30, and the GPS 40, and a variety of services without being limited to the time and space, the UE 10 is equipped with a number of wireless transceivers. For example, a smart phone includes LTE, WiFi, and Bluetooth (hereinafter referred to as a 'BT') transceivers, and a GPS receiver. In order to integrate a larger number of transceivers into the same UE 10 while maintaining good performance, the design of the UE 10 becomes complicated. For this reason, a possibility that In-device COexistence interference (hereinafter referred to as 'ICO') may occur may be further increased. ICO may also be called IDC (In-Device Coexistence interference).

Hereinafter, downlink refers to communication from the eNB 20 to the UE 10, and uplink refers to communication from the UE 10 to the eNB 20. In downlink, a transmitter may be a part of the eNB 20, and a receiver may be a part of the UE 10. Furthermore, in uplink, a transmitter may be a part of the UE 10, and a receiver may be a part of the eNB 20.

The UE 10 may be fixed or mobile. The UE 10 may also be called another terminology, such as a Mobile Station (MS), a User Terminal (UT), a Subscriber Station (SS), a Mobile Terminal (MT), or a Wireless Device. The eNB 20 refers to a fixed station communicating with the UE 10. The eNB 20 may also be called another terminology, such as a Base Station (BS), a Base Transceiver System (BTS), an Access Point (AP), a femto BS, a pico BS, or a relay.

Multiple access schemes applied to the wireless communication system are not limited. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA, may be used. In uplink transmission and downlink transmission, a Time Division Duplex (TDD) method in which transmission is performed on different times may be used or a Frequency Division Duplex (FDD) method in which transmission is performed using different frequencies may be used.

Meanwhile, if one UE performs communication on a number of network system bands at the same time, ICO may occur. ICO means that transmission performed by UE in one frequency band interferes with reception performed by the UE in the other frequency band. For example, if one UE supports a BT system and a Long Term Evolution (LTE) system at the same time, ICO may be generated between a BT system band and an LTE system band.

ICO may also be generated when one UE supports a Wireless Local Area Network (WLAN) system and a Global Positioning System (GPS) simultaneously with an LTE system in addition to when the UE supports the LTE system and the BT system at the same time. In other words, when a plurality of systems is operated at the same time, ICO may be generated between bands. In general, ICO may be generated when an interval between the frequency band boundaries of heterogeneous network systems is not sufficiently wide.

A Frequency Division Multiplexing (FDM) method and a Time Division Multiplexing (TDM) method may be used as techniques for avoiding ICO. The FDM method is a method of adjusting ICO by moving the frequency band of any one network system, for example, when interference occurs between the first frequency band of a first network system and the second frequency band of a second network system. That is, ICO is adjusted by is avoiding a frequency band where ICO is generated. Meanwhile, the TDM method is a method of adjusting ICO by preventing the transmission time of a first network system and the reception time of a second network system from overlapping with each other.

Figure 2:
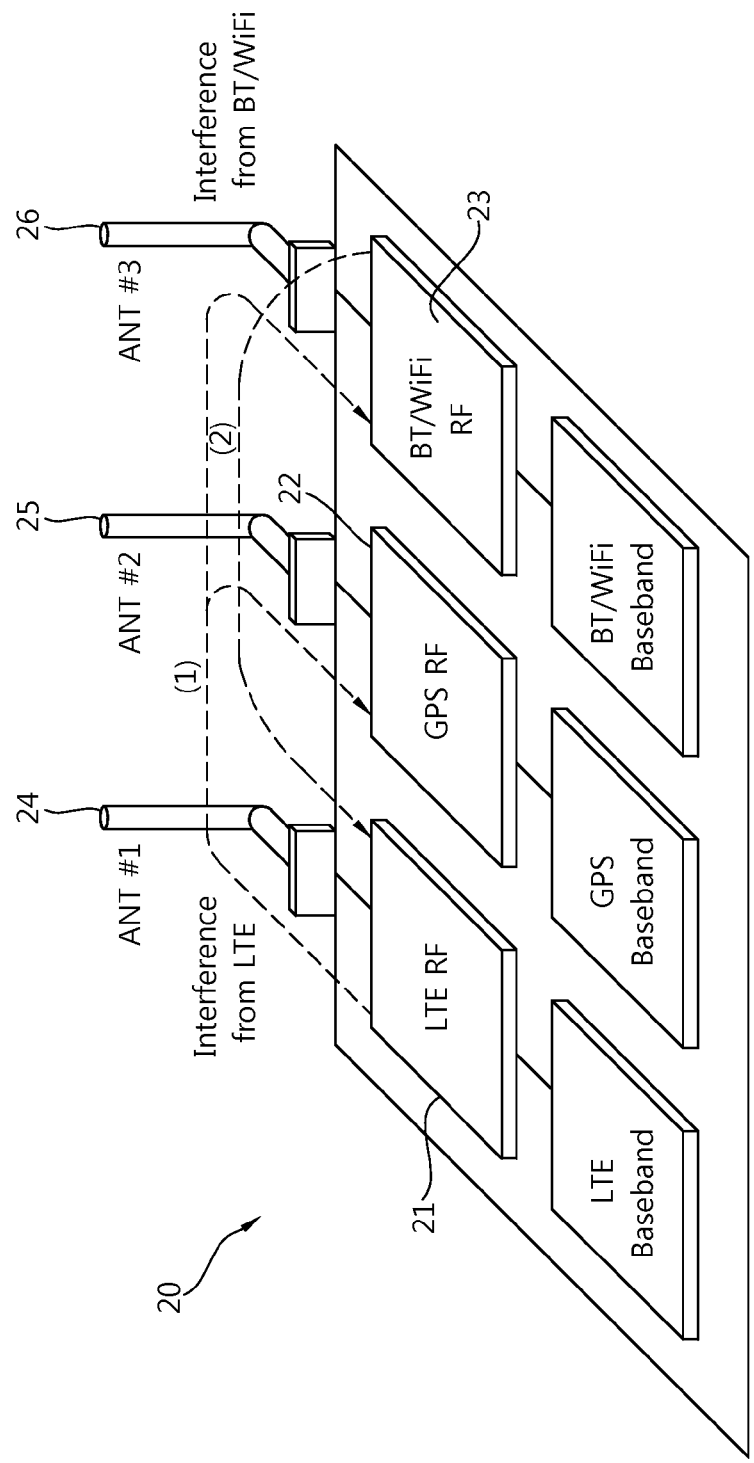
FIG. 2 is an explanatory diagram illustrating In-device COexistence interference (ICO) to which the present invention is applied.

FIG. 2 is an explanatory diagram illustrating ICO to which the present invention is applied.

Referring to FIG. 2, the UE 20 includes an LTE Radio Frequency (RF) 21, a GPS RF 22, and a BT/WiFi RF 23. Transmission and reception antennas 24, 25, and 26 are coupled to the respective LTE RF 21, GPS RF 22, and BT/WiFi RF 23. That is, various kinds of RFs are proximately mounted within one device platform. Here, the transmission power level of one RF toward the other RF receiver may be very greater than the reception power level of the other RF. In this case, if frequency spacing between the RFs is not sufficiently wide and an advanced filtering technique is not supported, the transmission signal of one RF may generate significant interference with the receiver of the other RF within the same device. For example, in FIG. 2, (1) shows an example in which the transmission signal of the LTE RF 21 generates ICO for the GPS RF 22 and the BT/WiFi RF 23, and (2) shows an example in which the transmission signal of the BT/WiFi RF 23 generates ICO for the LTE RF 21. An inter-signal effect caused by ICO is described in more detail with reference to FIG. 3.

Figure 3:
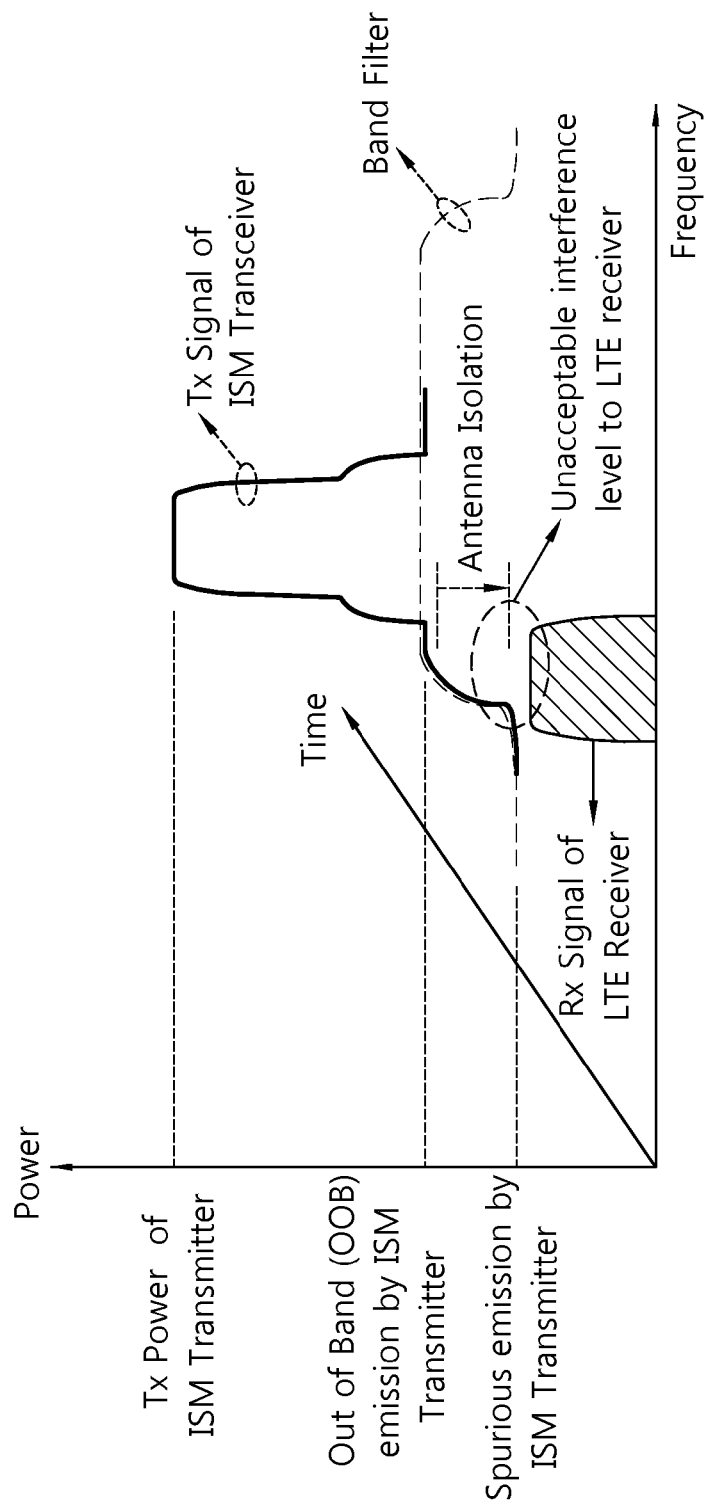
FIG. 3 is an example showing ICO from an Industrial, Scientific and Medical (ISM) transmitter to an LTE receiver to which the present invention is applied.

FIG. 3 is an example showing ICO from an Industrial, Scientific and Medical (ISM) transmitter to an LTE receiver to which the present invention is applied. An ISM band is a band which is freely used in the industrial, scientific, and medical fields without license.

From FIG. 3, it can be seen that there is a portion where the band of a signal received by the LTE receiver overlaps with the band of a signal transmitted by the ISM transmitter. In this case, ICO may occur. A frequency band where ICO has occurred as described above, a frequency band where the possibility of potential ICO is high, or a frequency band where ICO is scheduled to occur is called an ICO delicate band (also abbreviated to an interference delicate band). When interference is generated in the interference delicate band, the interference delicate band may not be used by UE, and thus the interference delicate band may be seen as a not-usable band (or unusable band). However, ICO is not essentially generated in the interference delicate band, and a frequency band where the possibility of potential interference is high may be treated as the interference delicate band.

Various pieces of interference experienced by a device, including ICO, may cause Radio Link Failure (RLF).

Figure 4:
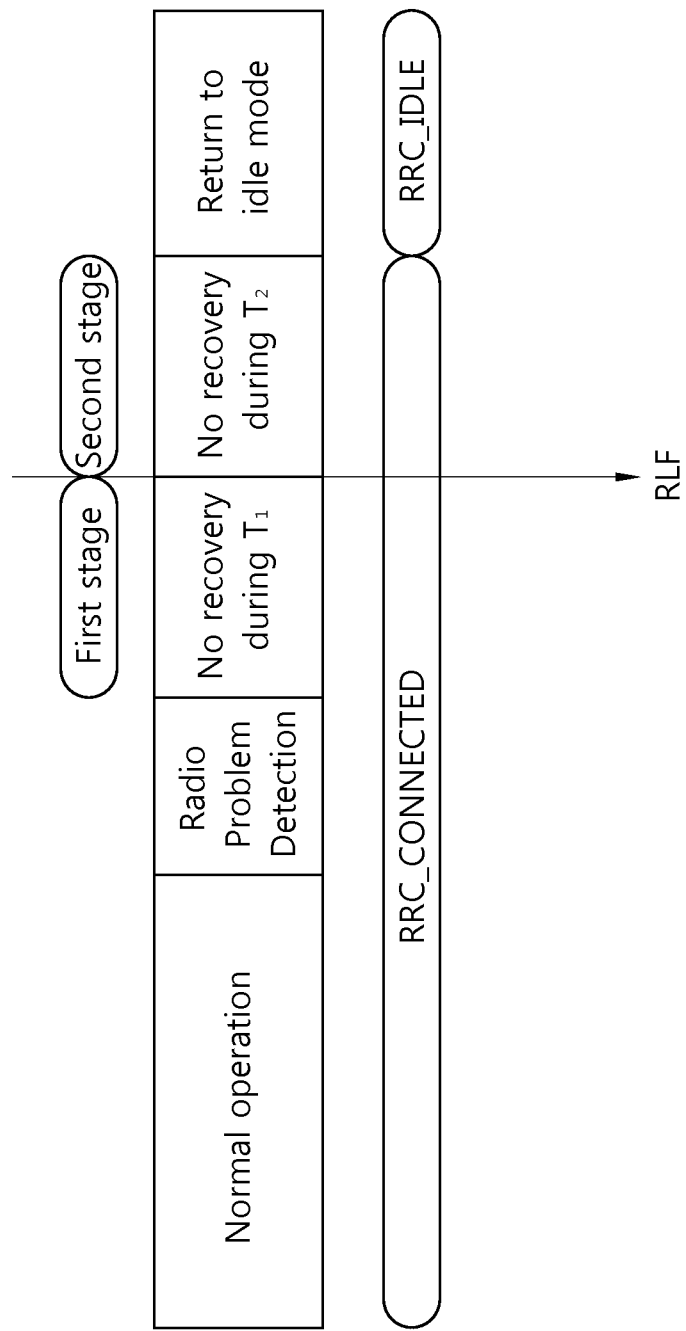
FIG. 4 is a diagram schematically illustrating Radio Link Failure (RLF) to which the present invention is applied.

FIG. 4 is a diagram schematically illustrating RLF to which the present invention is applied. Referring to FIG. 4, RLF may be divided into two phases.

When UE performing a normal operation detects a problem in a radio channel, the first stage of RLF is started. In order to check the problem of the radio channel, the UE may perform a configuration on the basis of the Reference Signal Received Power (RSRP) of a Cell-specific Reference Signal (CRS) and check the problem of the radio channel based on the configuration.

As shown in FIG. 4, if the problem of the radio channel checked until a predetermined specific time, for example, $T_1$ elapses is not recovered, it leads to RLF. Here, whether the specific time $T_1$ has elapsed may be checked by a specific timer within the UE. The UE may measure the specific time $T_1$ by using a timer for determining RLF or may use an elapsed time for other measurement as the specific time $T_1$.

If RLF is checked, the second stage of RLF is started. RLF that initiates the second stage includes handover failure. Referring to FIG. 4, if a radio link is not recovered to until a specific time, for example, $T_2$ elapses after the RLF (i.e., the checked problem of the radio channel is not recovered), the UE enters an RRC_IDLE mode. Whether the specific time $T_2$ has elapsed may be determined by a specific timer within the UE.

Table 1 is a diagram illustrating that how link connection will be operated depending on an operation of UE which may occur in each of the stages of RLF.

TABLE 1

| Cases | Case generated in first stage | Case generated in second stage | $T_2$ expired with no case occurred |
|---|---|---|---|
| UE enter the same cell | Continue if there is no problem in a radio channel | RRC connection re-establishment through direct signaling between UE and eNB | change to RRC_IDLE |
| UE selects another cell of the same eNB | N/A | RRC connection re-establishment through direct signaling between UE and eNB | change to RRC_IDLE |
| UE selects the cell of a prepared eNB | N/A | RRC connection re-establishment through direct signaling between UE and eNB | change to RRC_IDLE |
| UE selects the cell of another unprepared eNB | N/A | change to RRC_IDLE | change to RRC_IDLE |

Here, the 'prepared eNB' refers to an eNB that may perform a handover procedure although the UE performs handover earlier than expected.

Table 1 illustrates the operations of a radio link when situations defined in the four cases correspond to (1) a case generated in the first stage of RLF, (2) a case generated in the second stage of RLF, and (3) a case where $T_2$ expires with no case occurred.

(1) If UE returns back to the same cell in the first stage of RLF and there is no problem in a radio channel, the radio link continues to be normally operated, as seen from Table 1.

As described above, the first stage of RLF is started when a problem in a radio channel is checked. Here, whether a problem has occurred in a radio channel may be checked through Radio Link Monitoring (RLM).

RLM means that UE detects the downlink quality of a serving cell configured between the UE and an eNB on the basis of a Cell-specific Reference Signal (CRS). UE may estimate the downlink quality using specific parameters that are defined by a ratio of the reception energy of control channels to the reception energy of a measured CRS.

RLM may be set under the following conditions.

First, a criterion value for estimating downlink quality may be set through RLM. For example, a value represented in dB, at which a ratio of the reception energy of resource elements (i.e., a single subcarrier within a single OFDM symbol) on which a Physical Downlink Control Channel (PDCCH)/Physical Control Format Indicator Channel (PCFICH) are transmitted to the average reception energy of the resource elements of a CRS may be used as the criterion.

A Qout value, that is, a parameter being a criterion for declaring out-of-synchronization, from among the specific parameters used in RLM, may be set on the basis of a value at which the Block Error Rate (BER) of virtual PDCCH (based on a DCI format 1A) transmission in which an error of a PCFICH, together with parameters set to transmit the PDCCH and the PCFICH, is taken into consideration is determined to be 10% or higher. Here, the parameters set to transmit the PDCCH and the PCFICH may include a DCI format of a PDCCH, the number of OFDM symbols on which control information is transmitted within a subframe, an aggregation level indicating a self-duplication ratio of a PDCCH, and so on. The parameters are influenced by a downlink bandwidth.

The Qout value may have a different value depending on the number of antenna ports through which a CRS is transmitted. For example, assuming that the BER of virtual PDCCH transmission in which an error of a PCFICH is taken into consideration becomes 10% or higher, if a CRS is transmitted through only a single antenna port, a ratio of the energy of the PDCCH and the energy of the CRS that will be set as the Qout value may be 4 dB. Furthermore, if a CRS is transmitted through two or more antenna ports, 1 dB may be used as the criterion for the Qout value.

A Qin value, that is, a parameter being a criterion for declaring synchronization recovery or in-synchronization, from among the specific parameters used in RLM, may be set on the basis of a value having much higher reliability than the Qout value. That is, the Qin value may be set on the basis of a value at which the BER of virtual PDCCH (based on a DCI format 1C) transmission in which an error of a PCFICH, together with the parameters set to transmit the PDCCH and the PCFICH, is taken into consideration is determined to be 2% or higher.

The Qin value may have a different value depending on the number of antenna ports through which a CRS is transmitted. For example, assuming that the BER of virtual PDCCH transmission in which an error of a PCFICH is taken into consideration becomes 2% or higher, if a CRS is transmitted through only a single antenna port, a ratio of the energy of the PDCCH and the energy of the CRS that will be set as the Qin value may be 0 dB. Furthermore, if a CRS is transmitted through two or more antenna ports, −3 dB may be used as the criterion for is the Qin value.

In the above example, the reason why the value of the energy ratio, that is, the criterion of the Qin value is lower than the Qout value is that the parameters set to transmit the PDCCH and the PCFICH and the BER of virtual PDCCH transmission are used as criteria. Furthermore, the Qout value and the Qin value are influenced by the discontinuous reception (DRX) operation of UE for a relevant cell.

(2) If the UE returns to the same cell in the second stage of RLF, the UE selects another cell of the same eNB, or the UE selects the cell of a prepared eNB, the UE performs an RRC connection re-establishment procedure through direct signaling with the eNB to which the UE has returned or the selected eNB. If the UE selects another eNB not prepared in the second stage of RLF, the UE changes to an RRC_IDLE mode because the unprepared eNB cannot respond to the handover of the UE.

An RRC_IDLE mode is one of RRC modes depending on whether the RRC of UE has logical connection with the RRC of an Evolved-UMTS Terrestrial Radio Access Network (E-UTRAN). The RRC mode may be divided into an RRC_IDLE mode and an RRC_CONNECTED mode.

In the RRC_CONNECTED mode, an E-UTRAN may check the existence of UE is in each cell by cell through RRC connection between the UE and the E-UTRAN. Accordingly, it is possible to control UE cell by cell.

In the RRC_IDLE mode, an E-UTRAN is unable to check the existence of UE because there is no RRC connection between the UE and the E-UTRAN. Accordingly, a core network manages UE in the RRC_IDLE mode Tracking Area (hereinafter referred to as a 'TA') by TA having a larger range than a cell. In the RRC_IDLE mode, only the existence of UE is checked TA by TA. After UE changes to the RRC_CONNECTED mode, the UE may perform common communication over a network. The term 'common communication' includes not only a voice call, but also communication services, such as a video call and data communication that may be used by a user over a network. An eNB may broadcast a change of system information to UE in the RRC_IDLE mode through paging.

Referring to Table 1, in order to avoid changing to the RRC_IDLE mode by reestablishing RRC connection, in the second stage of RLF, the UE may perform an RRC connection re-establishment procedure through direct signaling with an eNB. More specifically, in order to avoid a shift to the RRC_IDLE mode, the UE may evaluate a cell through a random access procedure while maintaining the RRC_CONNECTED mode and perform the RRC connection re-establishment procedure according to a result of the evaluation. The RRC connection re-establishment procedure will be described later.

The random access procedure is performed when a network is accessed or when uplink synchronization has not been secured or lost. If RLF is generated, a contention-based random access procedure is performed when UE changes from the RRC_IDLE mode to the RRC_CONNECTED mode (i.e., initial access or TA update) or when UE has to transmit new data or control information with out-of-uplink synchronization or to receive new data and transmit ACK/NACK information to the received data.

Figure 5:
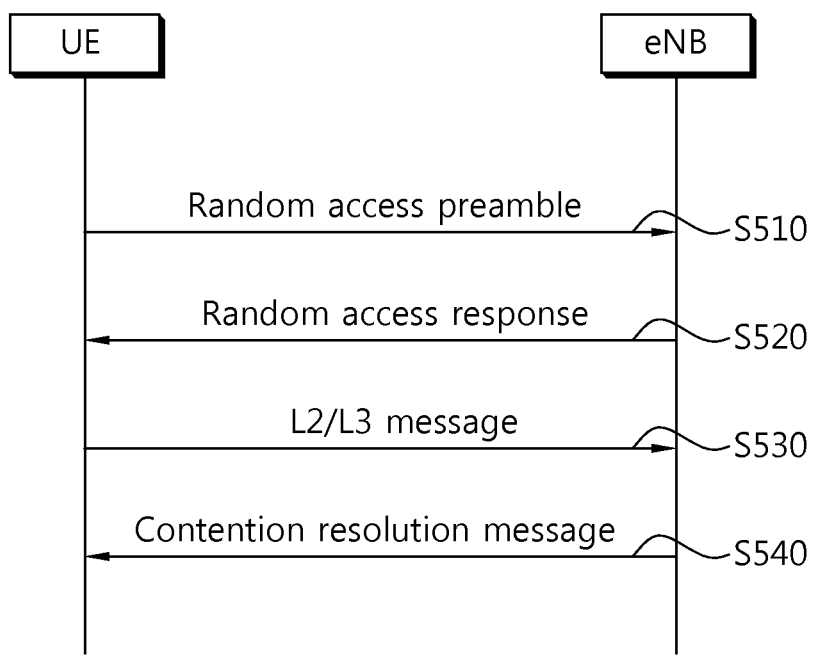
FIG. 5 is a flowchart schematically illustrating a contention-based random access procedure performed between UE and an eNB to which the present invention is applied.

FIG. 5 is a flowchart schematically illustrating a contention-based random access procedure performed between UE and an eNB to which the present invention is applied.

Referring to FIG. 5, the UE sends a preamble for random access to the eNB at step S510. The UE may randomly select one of the remaining preambles other than a preamble used in a non-contention random access procedure in 64 random access preambles and send the selected preamble to the eNB. The preamble may be transmitted to the eNB on a Physical Random Access Channel (PRACH). Here, a transport channel corresponding to the PRACH is called a Random Access Channel (RACH).

The eNB sends a Random Access Response (RAR) to the UE at step S520. The RAR is transmitted on a PDSCH. The RAR includes a Temporary Cell-Radio Network is Temporary Identifier (TC-RNTI) that may be temporarily used by the UE, an uplink grant, a time alignment instruction for uplink synchronization, and the ID of a selected preamble. In a contention-based random access procedure, UEs which have transmitted the same preamble using the same time-frequency resources may receive the same RAR.

The UE that has received the RAR transmits L2/L3 messages to the eNB on a PUSCH at step S530. The L2/L3 message, that is, a Medium Access Control (MAC) layer, a Radio Link Control (PLC) layer, a Packet Data Convergence Protocol (PDCP) layer/Radio Resource Control (RRC) layer messages include a TC-RNTI and a UE-specific ID.

The eNB transmits a contention resolution message to the UE at step S540. When the eNB transmits the contention resolution message including a selected UE-specific ID and TC-RNTI, one UE can be selected and a contention can be resolved although a plurality of UEs receives the same RAR.

Referring back to Table 1, if the UE returns to an original cell or selects another cell and then performs the above-described random access procedure in the second stage of RLF, the eNB of the original cell or the selected cell performs a link setup procedure by using information used in the contention-based random access procedure.

More specifically, C-RNTI information being used by the UE in the cell where RLF has occurred may be used as ID information about the UE, which one of the cases listed in Table 1 is related is determined by checking identity between cells based on the Physical Cell Identity (PCI) of the cell, and authority may be given to the UE based on MAC key information (i.e., ShortMAC-I).

The eNB checks that it has context corresponding to the ID information of the UE and restarts radio link connection.

If the eNB does not find the context of the UE, the UE has to release RRC connection and to set up (or reestablish) new RRC connection. Accordingly, the UE first changes the RRC mode to the RRC_IDLE mode and performs an RRC connection establishment procedure.

(3) If the cases of Table 1 are not generated until $T_2$ expires, that is, the second stage of RLF expires, the RRC mode of the UE changes to the RRC_IDLE mode.

The above-described RRC connection re-establishment procedure is described below.

The RRC connection re-establishment procedure is a procedure for establishing RRC connection again and for restarting an SRB1 operation of Signaling Radio Bearer (SRB).

Here, the SRB is a Radio Bearer (hereinafter referred to as an 'RB') only used to is transmit RRC and Non-Access Stratum (NAS) messages. The types of the SRB include an SRB0, an SRB1, and an SRB2.

First, the SRB0 is used for an RRC message using a Common Control CHhannel (CCCH) logical channel. A downlink CCCH is used to transmit information related to RRC connection establishment, connection re-establishment, connection establishment rejection, and connection re-establishment rejection. An uplink CCCH is used to transmit information related to an RRC connection request and an RRC connection re-establishment request.

The SRB1 is used for all RRC messages which use a Downlink Control CHannel (DCCH) logical channel. A part of an attached NAS message may be included in the RRC message. An attached downlink NAS message is used for only additional procedures, such as bearer setup/change/release procedures. The attached uplink NAS message is used only to transfer an initial NAS message during RRC connection establishment. Furthermore, the SRB1 is used for NAS messages before the SRB2 is set up.

From among the above-described DCCHs, the downlink DCCH is used to transmit information related to RRC connection reconfiguration and connection release. The downlink DCCH is also used to transmit information related to a security mode command, a count check, and a handover between heterogeneous networks. Furthermore, the downlink DCCH is used to transmit information related to downlink, a UE information request, and information related a UE capability inquiry.

From among the above-described DCCHs, the uplink DCCH is used to transmit information related to RRC connection reconfiguration completion, connection re-establishment completion, and connection establishment completion and is also used to transmit information related to a security mode establishment completion or security mode establishment failure, a count check response, and a proximity indication. Furthermore, the uplink DCCH is used to transmit information related to uplink, a measurement report, a UE information response, and UE capability information.

From among the types of the SRB, the SRB2 is used for NAS messages using a DCCH logical channel. The SRB2 has lower priority than the SRB1. After security activation, the SRB2 is always configured by Evolved-UMTS Terrestrial Radio Access Network (E-UTRAN). For example, if RRC connection establishment is completed and security establishment is completed, the SRB2 may be configured through an RRC connection reconfiguration procedure.

The RRC connection re-establishment procedure may be started in situations, such as when RLF is detected, when a handover fails, when an integrity check failure indicator is is transferred from a lower layer, and when RRC connection reconfiguration fails.

When the above situations are generated, UE starts searching for a cell suitable for attempting RRC connection re-establishment during a time interval for which the RRC connection re-establishment may be started. The cell suitable for attempting the RRC connection re-establishment may be a cell existing in the same network or a cell within a heterogeneous network that may be supported by the UE. Here, the time interval for which the RRC connection re-establishment may be started may be set by a time defined within the UE. In case of LTE, T311 may be used as a timer that sets the time interval for which the RRC connection re-establishment may be started. If a cell suitable for starting an RRC connection re-establishment procedure has not been retrieved during the time interval for which the RRC connection re-establishment may be started, the UE changes its RRC mode to the RRC_IDLE mode.

If a cell suitable for starting an RRC connection re-establishment procedure has been retrieved, the UE starts the RRC connection re-establishment procedure. In order to start the RRC connection re-establishment procedure, the UE satisfies all the three conditions below. If the UE does not satisfy all the three conditions, the UE changes its RRC mode to the RRC_IDLE mode.

(1) The UE is in the RRC_CONNECTED mode.
(2) Access Stratum (AS) security has been enabled.
(3) UE context is valid.

If the UE satisfies all the three conditions, the UE may start the RRC connection re-establishment procedure.

Figure 6:
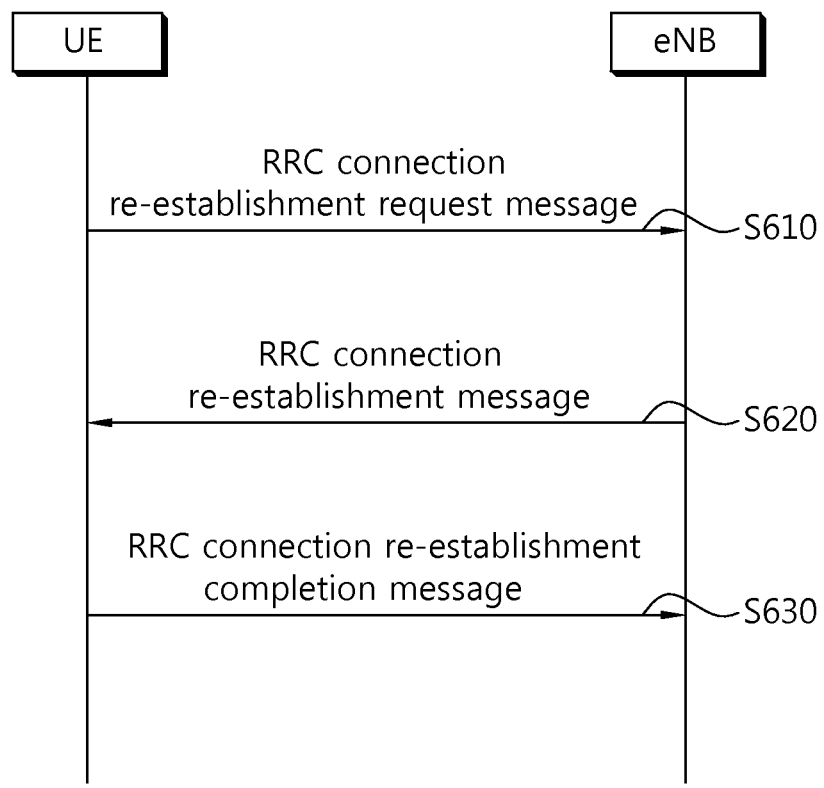
FIG. 6 is a flowchart schematically illustrating an RRC connection re-establishment procedure to which the present invention is applied.

FIG. 6 is a flowchart schematically illustrating an RRC connection re-establishment procedure to which the present invention is applied.

If UE satisfies the three conditions, the UE sends an RRC connection re-establishment request message (RRCConnectionReestablishmentRequest) to an eNB at step S610.

The RRC connection re-establishment request message may include a cause value to request RRC connection reestablishment. For example, if radio connection had failed due to RLF, RLF information as the cause value may be included in the RRC connection re-establishment request message. The RRC connection re-establishment request message may further include a Physical Cell Identity (PCI) capable of checking the previous cell ID of a relevant UE. If radio connection had failed due to RLF, the previous cell of a relevant UE may be a cell where the RLF has occurred.

Accordingly, when RLF occurs, the eNB (or E-UTRAN) may obtain RLF information through the RRC connection re-establishment request message from the UE.

The eNB (or E-UTRAN) checks the contents of the RRC connection re-establishment request message. If, as a result of the check, it is determined that the RRC connection re-establishment is possible, the eNB transmits an RRC connection re-establishment message (RRCConnectionReestablishment) to the UE for RRC connection re-establishment at step S620. The RRC connection re-establishment message includes information necessary to perform a procedure of reconfiguring the SRB1 and restarting the transmission of data related to only the SRB1 and a procedure of enabling AS security again without a change of a security algorithm.

In response to the RRC connection re-establishment message, the UE reconfigures the SRB1 based on information within the RRC connection re-establishment message and performs a procedure of restarting the transmission of data related to only the SRB1 and a procedure of enabling AS security again without a change of a security algorithm.

After the procedures are completed, the UE transmits an RRC connection re-establishment completion message (RRCConnectionReestablishmentComplete) to the eNB (or E-UTRAN) at step S630.

As described above, through the RRC connection re-establishment procedure, UE may transfer RLF information to an E-UTRAN (or eNB), and the E-UTRAN (or eNB) may obtain pertinent information from the UE where the RLF has occurred.

Meanwhile, the RLF information reported to the E-UTRAN may be transferred to a related eNB through an RLF indication procedure or a handover report.

An example in which an RLF report from UE is transferred between eNBs within a network is first described below.

Figure 7:
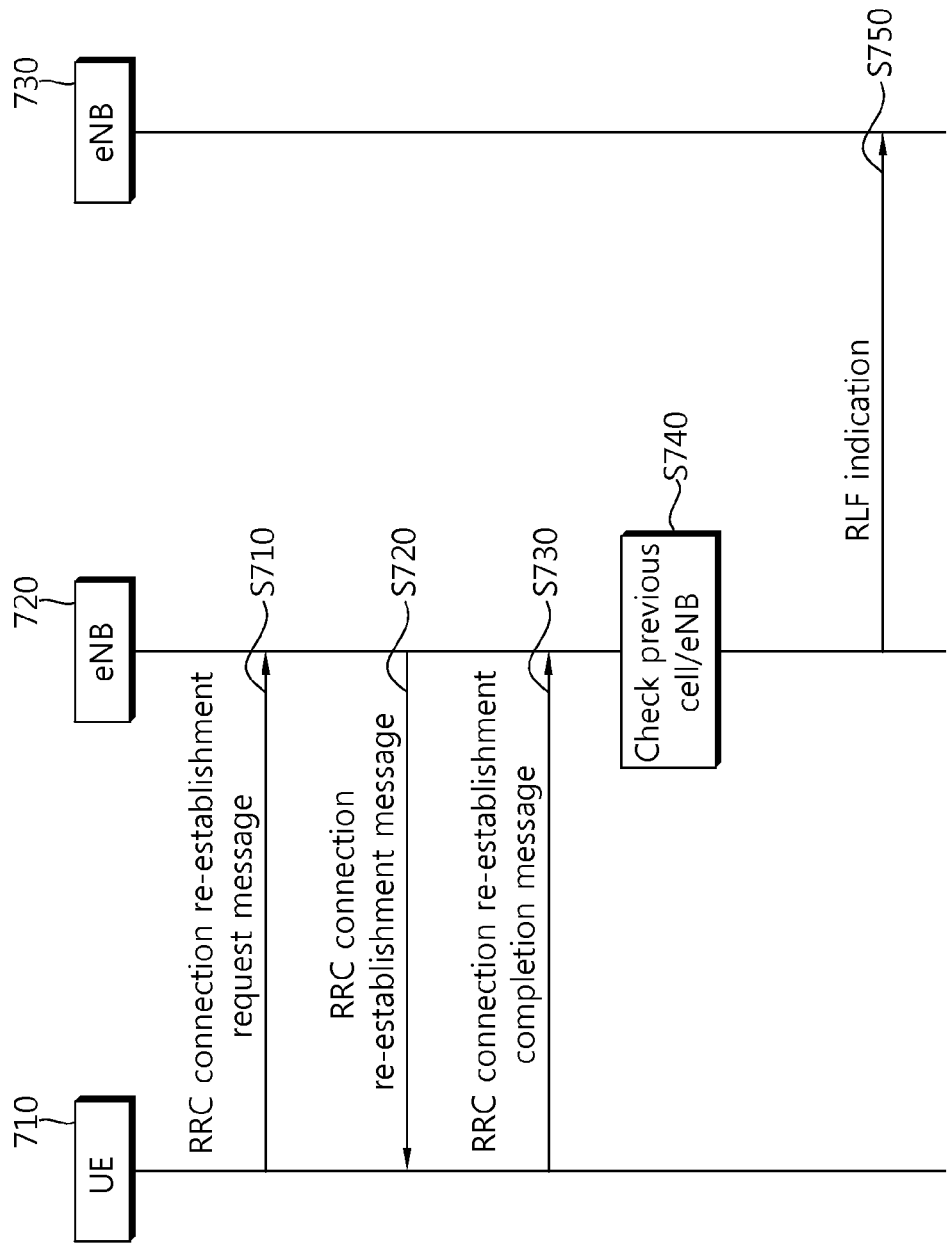
FIG. 7 is a diagram schematically illustrating an RLF indication to which the present invention is applied.

FIG. 7 is a diagram schematically illustrating an RLF indication to which the present invention is applied. An object of an RLF indication is to improve the mobility of UE within a network by transferring information, associated with the above-described RRC connection re-establishment request, to eNBs including an eNB where RLF has occurred through an X2 interface within an E-UTRAN.

Referring to FIG. 7, UE 710 performs the RRC connection re-establishment procedure S610 to S630, described above with reference to FIG. 6, along with an eNB 720 at step S710 to S730.

After the RRC connection re-establishment procedure is completed, the eNB 720 may check the previous serving cell or eNB (hereinafter referred to as a 'previous eNB', for is convenience of description) of the UE 710 based on PCI information received from the UE 710 at step S740.

The eNB 720 transmits an RLF indication message to an eNB 730 that complies with the PCI received from the UE 710 at step S750. Here, the RLF indication message is transferred through an X2 interface between the eNBs, and it may include an ID for the UE 710, such as a C-RNTI.

If the UE ID received from the eNB 720 is identical with UE context owned by the previous eNB 730, the previous eNB 730 of the UE 710 analyzes the cause of the RLF between the UE 710 and the eNB 730 which was generated before the RRC connection re-establishment procedure.

The UE 730 may improve network quality and UE mobility by solving the cause of the RLF through the analysis.

In FIG. 7, an example in which the eNB 720 transmits the RLF indication message to the eNB 730 after RRC connection re-establishment between the UE 710 and the eNB 720 is completed has been described, but this is just an example of an RLF indication. For example, the eNB 720 may receive the PCI information by receiving the RRC connection re-establishment request message from the UE 710 and then transmit the RLF indication message to is the eNB 730 even before the RRC connection re-establishment is completed.

Figure 8:
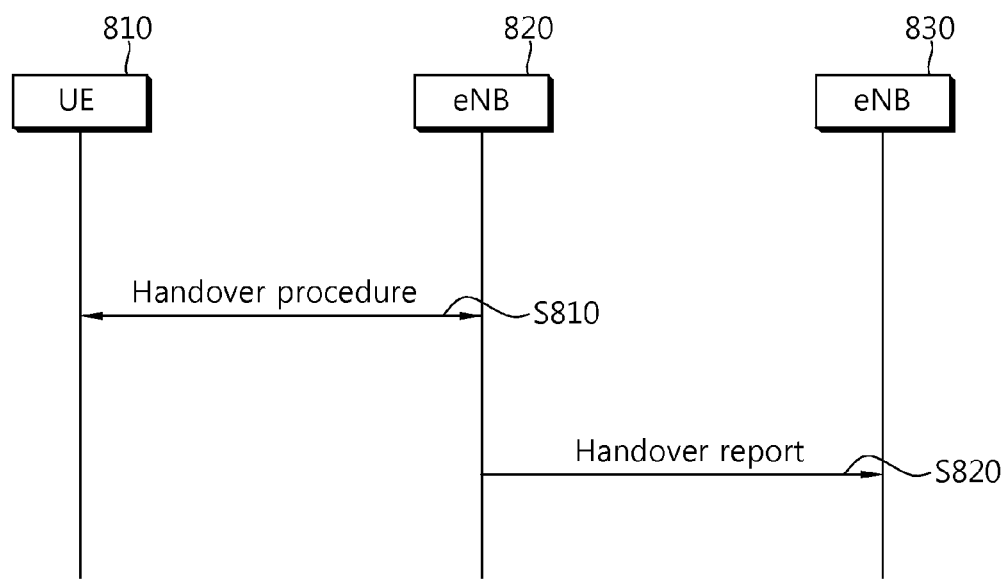
FIG. 8 is a diagram schematically illustrating a handover report to which the present invention is applied.

FIG. 8 is a diagram schematically illustrating a handover report to which the present invention is applied.

A handover report between eNBs is performed in order to improve UE mobility within a network by transferring RLF information that may shortly occur after a successful handover through an X2 interface within an E-UTRAN. For example, if a target eNB does not handle a situation because a handover procedure is completed too early, generated RLF information may be shared by eNBs through a handover report procedure. For reference, if RLF is generated due to a delayed handover, RLF information may be shared by eNBs through the above-described RLF indication procedure.

Referring to FIG. 8, a handover procedure is performed between UE 810 and an eNB 820 at step S810. As described above, RLF may shortly occur even after the handover is successfully performed.

In this case, the eNB 820 (i.e., an original target eNB) that has recovered RLF and has re-established a radio link transmits a handover report, including RLF information, to a pertinent eNB 830 at step S820. Here, the pertinent eNB includes a source cell or a target cell or both and a cell where RRC connection re-establishment has occurred, which are checked is based on a PCI received from the original source eNB and the UE 810.

The RLF information included in the handover report may include a possible fundamental cause (e.g., a too early handover, or information indicating a handover to a wrong cell) of mobility failure that has generated the RLF at the time of a handover.

An example in which RLF information owned by UE is transferred to an E-UTRAN after RRC connection re-establishment is described below. The RLF information transferred through a UE information procedure may be shared by eNBs within the E-UTRAN, including an eNB where RLF has occurred, through an RLF indication or a handover report.

Figure 9:
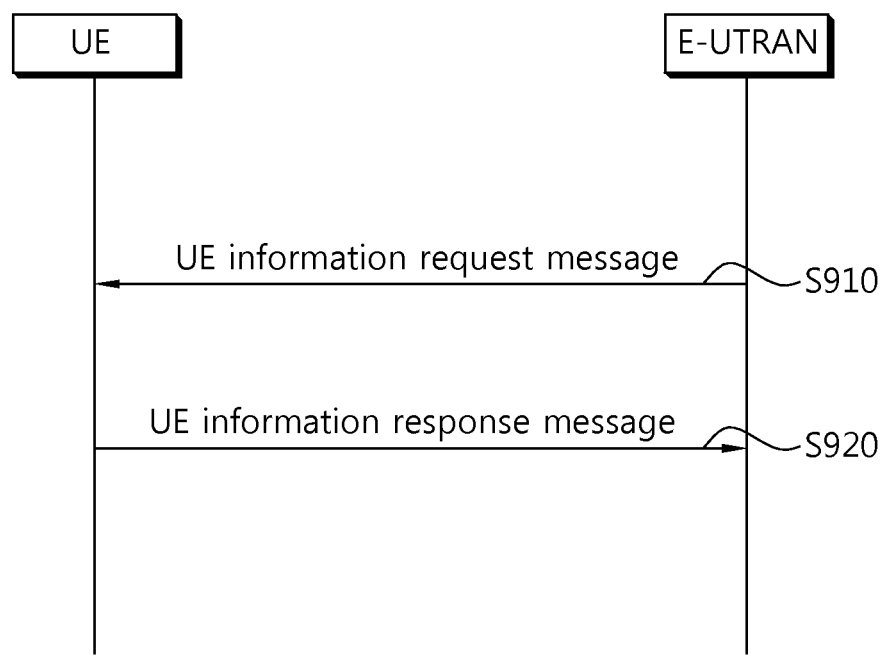
FIG. 9 is a flowchart schematically illustrating a UE information procedure to which the present invention is applied.

FIG. 9 is a flowchart schematically illustrating the UE information procedure to which the present invention is applied.

An E-UTRAN transmits UE information request message (UEInformationRequest) to UE at step S910. The UE information request message is a message commonly used for the E-UTRAN to retrieve (or search) the UE for information. The UE information request message uses the SRB1 and has an Acknowledged Mode (AM) regarding a Radio Link Control (RLC)-Service Access Point (SAP). The UE information request message is transmitted on a logical channel Dedicated Control CHannel (DCCH) through RRC signaling.

Table 2 shows an example of the UE information request message.

TABLE 2

```
-- ASN1START
UEInformationRequest-r9    ::=          SEQUENCE {
    rrc-TransactionIdentifier           RRC-TransactionIdentifier,
    criticalExtensions                  CHOICE {
        c1                                  CHOICE {
            ueInformationRequest-r9             UEInformationRequest-r9-IEs,
            spare3 NULL, spare2 NULL, spare1 NULL
```

TABLE 2-continued

```
    },
        criticalExtensionsFuture        SEQUENCE { }
    }
}
UEInformationRequest-r9-IEs ::=     SEQUENCE {
    rach-ReportReq-r9                       BOOLEAN,
    rlf-ReportReq-r9                        BOOLEAN,
    nonCriticalExtension                UEInformationRequest-v930-IEs
    OPTIONAL
}
UEInformationRequest-v930-IEs ::= SEQUENCE {
    lateNonCriticalExtension            OCTET STRING               OPTIONAL, --
Need OP
    nonCriticalExtension                UEInformationRequest-v10xy-IEs   OPTIONAL
}
UEInformationRequest-v10xy-IEs ::=  SEQUENCE {
    logMeasReportReq-r10                    ENUMERATED {true}          OPTIONAL, --
Need ON
    nonCriticalExtension                SEQUENCE { }               OPTIONAL  --
Need OP
}
-- ASN1STOP
```

In the UE information request message of Table 2, logMeasReportReq is a field indicating whether or not to report logged measurement information. UE may store the state of a wireless communication environment in the form of a new log by continuing to accumulate the state of the wireless communication environment whenever the state is measured. The UE may report, to an eNB, that the UE now has a log accumulated by performing a Minimization Driving Test (hereinafter referred to as an 'MDT'). For example, logged measurement information may be written by UE based on pieces of information measured according to a measurement method additionally configured in order to perform a MDT. The MDT is a method of measuring a network environment, such as call quality within a cell, without directly measuring the call quality by moving all areas within the cell using a vehicle. Furthermore, rlf-ReportReq is a field indicating whether or not to report information related to RLF.

Figure 10:
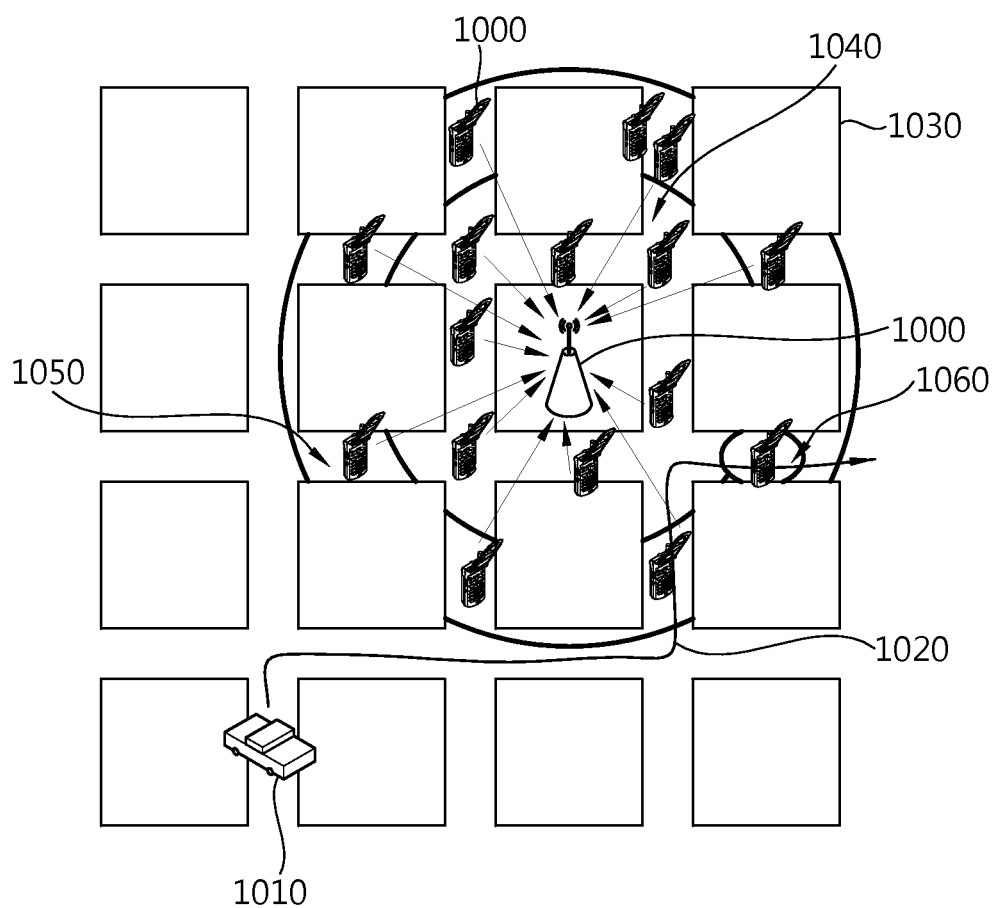
FIG. 10 is a diagram schematically illustrating a basic concept of a Minimization Driving Test (MDT) to which the present invention is applied.

FIG. 10 is a diagram schematically illustrating a basic concept of the MDT to which the present invention is applied.

Referring to FIG. 10, call quality within a cell is changed depending on the position of a building 1030 or topography. There is a shadow region 1060, and a possible call area includes an area 1040 having good call quality and an area 1050 having poor call quality. When measuring a communication situation, for example, call quality within a cell, a measurement vehicle 1010 has only to move only the least path 1020 by using a number of UEs 1000 scattered within the cell.

In addition to the measurement performed by the moving vehicle 1010, measurement for the wireless environment is performed by a number of the UEs at several places within the cell. Each of the UEs may measure a wireless environment at its current position according to MDT setting. The UE may write the result of the measurement in the form of a is log and store the log.

Referring back to the fields of the UE information request message, rach-ReportReq is a field indicating whether UE has to report information about a random access procedure.

absoluteTimeStamp is a field indicating an absolute time when measurement logging was set, and the field absoluteTimeStamp is included in a message absoluteTimeInfo and provided by an E-UTRAN.

contentionDetected is a field indicating that contention for at least one of transmitted preambles has been detected.

failedPCellId is a field indicating a primary cell (PCell) where RLF was generated or a target PCell for a failed handover.

measResultLastServCell is a field referring to the result of the last measurement performed by a PCell where RLF was generated.

numberOfPreamblesSent is a field indicating the number of RACH preambles transmitted.

previousPCellId is a field indicating the source PCell of the last handover. The source PCell is a source PCell when the last RRC-ConnectionReconfiguration message including mobilitycontrolInformation was received.

relativeTimeStamp is a field indicating the time when a logging measurement result was obtained and is measured as a relative value for the field absoluteTimeStamp. The field relativeTimeStamp has a value in second.

traceReference is a field indicating a parameter traceReference received through a field LoggedMeasurementConfiguration.

traceRecordingSession is a field indicating a parameter traceRecodingSession received through LoggedMeasurementConfiguration.

Meanwhile, with the development of wireless communication technology, compatibility between the existing system and a newly constructed system is problematic. That is, the newly constructed system may be operated while supporting all the existing methods, but the existing system may not support a new method. Accordingly, it is necessary to indicate whether messages transmitted and received on a system are supported by the existing system.

In Table 2, r9 and r10, together with their field names, are marked in order to indicate the version or release of technology supporting relevant technology. For example, in the example of Table 2, the field marked by r9 may be recognized by both the existing system and a new system, but the field marked by r10 may be recognized by only a new system, but may is not be recognized by the existing system.

In this specification, a description of the present invention is given while maintaining the method of marking the technological version or technological release illustrated in Table 2. In this case, the concreteness of the embodiment is further added by showing an example of the technological version, but it is to be noted that the technical spirit of the present invention is not changed or limited by the display of the technological version.

The UE that has received a UE information request message configures a UE information response message (UEInformationResponse) and sends the UE information request message to the E-UTRAN at step S920.

The UE information response message is a message used for the UE to transmit information requested by the E-UTRAN. The SRB1 is illustrated as being used as the UE information request message, but the SRB2 may be used if logged information is transmitted. The UE information response message is a mode regarding an RLC-SAP, and it has an AM. The UE information request message is transmitted on a logical channel DCCH through RRC signaling.

Table 3 shows an example of the UE information response message.

TABLE 3

```
-- ASN1START
UEInformationResponse-r9    ::=              SEQUENCE {
    rrc-TransactionIdentifier                RRC-TransactionIdentifier,
    criticalExtensions                       CHOICE {
        c1                                   CHOICE {
            ueInformationResponse-r9                 UEInformationResponse-r9-IEs,
            spare3 NULL, spare2 NULL, spare 1 NULL
        },
        criticalExtensionsFuture             SEQUENCE { }
    }
}
UEInformationResponse-r9-IEs ::=             SEQUENCE {
    rach-Report-r9                           SEQUENCE {
        numberOfPreamblesSent-r9                 INTEGER (1..200),
        contentionDetected-r9                    BOOLEAN
    }                                                                    OPTIONAL,
    rlf-Report-r9                            RLF-Report-r9               OPTIONAL,
    nonCriticalExtension                     UEInformationResponse-v930-IEs
    OPTIONAL
}
UEInformationResponse-v930-IEs ::=   SEQUENCE {
    lateNonCriticalExtension                 OCTET STRING                OPTIONAL,
    nonCriticalExtension                     UEInformationResponse-v10xy-IEs    OPTIONAL
}
UEInformationResponse-v10xy-IEs ::=  SEQUENCE {
    logMeasReport-r10                        LogMeasReport-r10           OPTIONAL,
    nonCriticalExtension                     SEQUENCE { }                OPTIONAL
}
RLF-Report-r9 ::=                    SEQUENCE {
    measResultLastServCell-r9                SEQUENCE {
        rsrpResult-r9                            RSRP-Range,
        rsrqResult-r9                            RSRQ-Range              OPTIONAL
    },
    measResultNeighCells-r9                  SEQUENCE {
        measResultListEUTRA-r9                   MeasResultList2EUTRA-r9     OPTIONAL,
        measResultListUTRA-r9                    MeasResultList2UTRA-r9      OPTIONAL,
        measResultListGERAN-r9                   MeasResultListGERAN         OPTIONAL,
        measResultsCDMA2000-r9                   MeasResultList2CDMA2000-r9  OPTIONAL
    }    OPTIONAL,
    ...,
    [[ locationInfo-r10                      LocationInfo-r10   OPTIONAL,
        failedPCellId                        CHOICE {
            ecgi                                 CellGlobalIdEUTRA,
            pci-arfcn                            SEQUENCE {
                physCellId                           PhysCellId,
                carrierFreq                          ARFCN-ValueEUTRA
            }
        }                                                                OPTIONAL,
        previousPCellId      CellGlobalIdEUTRA                           OPTIONAL
    ]]
}
MeasResultList2EUTRA-r9 ::=          SEQUENCE (SIZE (1..maxFreq)) OF MeasResult2EUTRA-r9
MeasResult2EUTRA-r9 ::=              SEQUENCE {
    carrierFreq-r9                           ARFCN-ValueEUTRA,
    measResultList-r9                        MeasResultListEUTRA
}
MeasResultList2UTRA-r9 ::=           SEQUENCE (SIZE (1..maxFreq)) OF MeasResult2UTRA-r9
MeasResult2UTRA-r9 ::=               SEQUENCE {
    carrierFreq-r9                           ARFCN-ValueUTRA,
    measResultList-r9                        MeasResultListUTRA
}
MeasResultList2CDMA2000-r9 ::=       SEQUENCE (SIZE (1..maxFreq)) OF MeasResult2CDMA2000-r9
MeasResult2CDMA2000-r9 ::=           SEQUENCE {
    carrierFreq-r9                           CarrierFreqCDMA2000,
    measResultList-r9                        MeasResultsCDMA2000
}
LogMeasReport-r10 ::=                SEQUENCE {
    absoluteTimeStamp-r10                    AbsoluteTimeInfo-r10,
    traceReference-r10                       SEQUENCE {
        plmn-Identity-r10                        PLMN-Identity,
        traceId-t10                              OCTET STRING (SIZE (3))
    },
    traceRecordingSession-r10                OCTET STRING (SIZE (2)),
```

TABLE 3-continued

```
    logMeasInfoList-r10        LogMeasInfoList-r10,
    logMeasAvailable-r10                    ENUMERATED {true}              OPTIONAL,
    ...
}
LogMeasInfoList-r10 ::=    SEQUENCE (SIZE (1..maxLogMeasReport-r10)) OF LogMeasInfo-r10
LogMeasInfo-r10 ::=     SEQUENCE {
    locationInfo-r10                LocationInfo-r10        OPTIONAL,
    relativeTimeStamp-r10           INTEGER (0..7200),
    servCellIdentity-r10            CellGlobalIdEUTRA,
    measResultServCell-r10          SEQUENCE {
        rsrpResult-r10                  RSRP-Range,
        rsrqResult-r10                  RSRQ-Range
    },
    measResultNeighCells-r10        SEQUENCE {
        measResultListEUTRA-r10         MeasResultList2EUTRA-r9         OPTIONAL,
        measResultListUTRA-r10          MeasResultList2UTRA-r9          OPTIONAL,
        measResultListGERAN-r10         MeasResultList2GERAN-r10        OPTIONAL,
        measResultListCDMA2000-r10      MeasResultList2CDMA2000-r9      OPTIONAL
    }   OPTIONAL,
    ...
}
MeasResultList2GERAN-r10 ::=        SEQUENCE (SIZE (1..maxFreq)) OF MeasResultListGERAN
-- ASN1STOP
```

The UE information response message may be configured based on each of the fields of the UE information request message. A method of UE configuring the UE information response message is described below.

(1) rach-Report

If rach-ReportReq on the UE information request message is set to 'True', rach-Report on the UE information response message corresponding to rach-ReportReq is set as follows.

numberOfPreamblesSent is set. numberOfPreamblesSent is a field indicating the number of preambles transmitted by MAC for the last random access procedure successfully completed.

ContentionDetected is set. If a contention resolution is not successful for at least one preamble in the last random access procedure successfully completed, ContentionDetected is set to 'True'. In other cases, ContentionDetected is set to 'False'.

(2) rlf-Report

If rlf-ReportReq on the UE information request message is set to 'True', UE owns RLF information or handover failure information in VarRLF-Report, and a value of plmn-Identity stored in VarRLF-Report is identical with a Registered Public Land Mobile Network (R-PLMN), rlf-Report is included in the UE information response message. Here, a value of rlf-Report is set to be identical with the rlf-Report value of VarRLF-Report owned by the UE.

Table 4 shows an example of VarRLF-Report owned by UE.

TABLE 4

```
    VarRLF-Report ::=       SEQUENCE {
        rlf-Report-r9           RLF-Report-r9,
        plmn-Identity-r10       PLMN-Identity
    }
```

UE may obtain information about RLF and store relevant information in the is subfield of RLF-Report.

If the UE information response message including rlf-Report is successfully transmitted, the UE discards a value of rlf-Report within a VarRLF-Report. Here, whether the UE information response message including rlf-Report has been successfully transmitted may be checked (or conformed) by a lower layer L1 or L2.

(3) logMeasReport

If logMeasReportReq is included in the UE information request message, a value of plmn-identity stored in VarLog-MeasReport owned by UE is identical with R-PLMN, and VarLogMeasReport includes one or a number of logged measurement entries, content regarding logMeasReport within the UE information response message is set as follows.

Table 5 shows an example of VarLogMeasReport owned by UE.

TABLE 5

```
    VarLogMeasReport ::=        SEQUENCE {
        logMeasReport-r10           LogMeasReport-r10,
        plmn-Identity-r10           PLMN-Identity
    }
```

UE may store a log, stored through an MDT, in the subfield of LodMeasInfo.

absoluteTimeStamp is included in logMeasReport. A value of absoluteTimeStamp is set to be identical with the absoluteTimeInfo value of VarLogMeasReport owned by UE.

traceReference is included in logMeasReport. A value of traceReference is set to be identical with the traceReference value of VarLogMeasReport owned by UE.

traceRecordingSession is included in logMeasReport. A value of traceRecordingSession is set to be identical with the traceRecordingSession value of VarLogMeasReport owned by UE.

logMeasInfoList is included in logMeasReport. logMeasInfoList is set to include one entry or a number of entries from the first entry, from among the logged entries of VarLogMeasReport owned by UE.

Here, if VarLogMeasReport owned by UE is not empty, that is, a log written by the measurement of an MDT is available, logMeasAvailable is added to logMeasReport, and a value of logMeasReport is set to 'True'.

When the UE information response message including logMeasReport is successfully transmitted, the logged measurement entries included in the logMeasInfoList value within VarLogMeasReport owned by UE are discarded. Whether the UE information response message has been successfully transmitted may be checked through a lower layer L1 or L2.

Meanwhile, log information is transferred through the SRB2. Accordingly, whether the UE information response message will be transferred through the SRB1 or the SRB2 is may be determined depending on whether it includes the log information. For example, if the UE information response message includes logMeasReport, the UE information response message is transmitted to a lower layer through the SRB2. If the UE information response message does not include logMeasReport, the UE information response message is transmitted to a lower layer through the SRB1.

The In-device COexistence interference (ICO) and the RLF report are described below.

RLF may be generated according to a network state, but may also be generated by interference power due to other modems (e.g., modems for a WLAN, Bluetooth, and a GPS) within a device, that is, ICO.

Information about RLF due to ICO (hereinafter referred to as 'ICO-RLF', for convenience of description) may also be included in the UE information response message and then transmitted.

ICO-RLF information included in the UE information response message may be configured to include (1) the reception power and interference power value of another transceiver (or modem) within a device along with the indication of RLF occurred due to ICO and (2) only whether interference due to another transceiver within a device has occurred along with the indication of RLF occurred due to ICO.

Here, another transceiver is a transceiver included in UE along with a transceiver for an LTE system, and it refers to a transceiver for another wireless communication system other than the LTE system.

When UE sends ICO-RLF information, an example in which the UE receives rlf-ReportReq on the UE information request message and transmits the ICO-RLF information and an example in which the UE receives logMeasReportReq regarding an MDT and transmits the ICO-RLF information are described below.

(1) If UE receives rlf-ReportReq

Table 6 shows an example of information about RLF (or wireless communication failure) when UE receives rlf-ReportReq and sends the information about RLF to an eNB or E-UTRAN in response thereto in a system to which the present invention is applied. Table 6 shows an example in which ICO-RLF information is used to report whether there was an influence of interference power due to another transceiver within UE.

TABLE 6

| RLF-Report-r9 ::= | SEQUENCE { | | |
|---|---|---|---|
| measResultLastServCell-r9 | SEQUENCE { | | |
| rsrpResult-r9 | RSRP-Range, | | |
| rsrqResult-r9 | RSRQ-Range | OPTIONAL | |
| }, | | | |
| measResultNeighCells-r9 | SEQUENCE { | | |
| measResultListEUTRA-r9 | MeasResultList2EUTRA-r9 | OPTIONAL, | |
| measResultListUTRA-r9 | MeasResultList2UTRA-r9 | OPTIONAL, | |
| measResultListGERAN-r9 | MeasResultList2GERAN | OPTIONAL, | |
| measResultsCDMA2000-r9 | MeasResultList2CDMA2000-r9 | OPTIONAL | |
| } OPTIONAL, | | | |
| measResultIDC-r10 | Boolean | OPTIONAL, | |
| ..., | | | |
| previousPCellId | CellGlobalIdEUTRA | | OPTIONAL |
| } | | | |

In Table 6, a measResultIDC field indicates whether there was an influence of interference power due to another transceiver within UE. For example, if a value of the measResultIDC field is True, it may indicate that there was an influence of another transceiver within UE. If the value of the measResultIDC field is False, it may indicate that there was no influence of interference power due to another transceiver within UE.

In Table 6, the measResultIDC field may be optionally added and thus may be set only when there was an influence of interference power due to another transceiver within UE.

Unlike in Table 6, whether there was an influence of interference power due to another transceiver within UE may be reported by each transceiver.

Table 7 is another embodiment of information about RLF (or wireless communication failure) when UE receives rlf-ReportReq and sends the information about RLF (or wireless communication failure) to an eNB or E-UTRAN in response thereto in a system to which the present invention is applied. Table 7 shows an example in which ICO-RLF information is used to report whether there was an influence of interference power due to transceivers within UE by transceiver.

TABLE 7

| RLF-Report-r9 ::= | SEQUENCE { | |
|---|---|---|
| measResultLastServCell-r9 | SEQUENCE { | |
| rsrpResult-r9 | RSRP-Range, | |
| rsrqResult-r9 | RSRQ-Range | OPTIONAL |
| }, | | |
| measResultNeighCells-r9 | SEQUENCE { | |
| measResultListEUTRA-r9 | MeasResultList2EUTRA-r9 | OPTIONAL, |

TABLE 7-continued

```
        measResultListUTRA-r9         MeasResultList2UTRA-r9      OPTIONAL,
        measResultListGERAN-r9        MeasResultListGERAN         OPTIONAL,
        measResultsCDMA2000-r9        MeasResultList2CDMA2000-r9  OPTIONAL
    } OPTIONAL,
    measResultIDC-r10                 SEQUENCE {
        measResultWLAN        Boolean     OPTIONAL,
        measResultBTBoolean               OPTIONAL,
        measResultGPSBoolean              OPTIONAL,
        measResultOtherBoolean            OPTIONAL
    } OPTIONAL,
    ...,
        previousPCellId       CellGlobalIdEUTRA         OPTIONAL
}
```

In the RLF report of Table 7, whether there was an influence of interference power due to other transceivers within UE may be indicated by a measResultIDC field. For example, whether there was an influence of interference power due to other transceivers within UE may be indicated by the subfields of the measResultIDC field.

More specifically, whether there was an influence of interference power due to other transceivers within UE may be indicated by transceiver depending on whether the value of each of the subfields of the measResultIDC field is True or False. For example, if the value of a measResultWLAN field is True, it may indicate that there was an influence of interference power due to the transceiver of a WLAN system. If the value of the measResultWLAN field is False, it may indicate that there was no influence of interference power due to the transceiver of a WLAN system.

Likewise, if the value of a measResultBT field is True, it may indicate that there was an influence of interference power due to the transceiver of a BT system. If the value of the measResultBT field is False, it may indicate that there was no influence of interference power due to the transceiver of a BT system.

Furthermore, if the value of a measResultGPS field is True, it may indicate that there was an influence of interference power due to the transceiver of a GPS. If the value of the measResultGPS field is False, it may indicate that there was no influence of interference power due to the transceiver of a GPS.

Here, if whether interference was caused by which one of transceivers within UE cannot be clearly determined, whether there was an influence of interference power may be indicated through a measResultOther field. If a value of the measResultOther field is True, it does not clearly indicate whether interference was caused by interference power due to the transceiver of what system, but it may indicate that there was an influence of interference power or there was an influence of interference power due to two or more transceivers.

Meanwhile, whether there was an influence of interference power due to the is transceiver of a communication system corresponding to a subfield of a measResultIDC field may not be indicated depending on whether a value of the subfield of the measResultIDC field is True or False, but subfields for respective communication systems, such as measResultWLAN, measResultBT, measResultGPS, and measResultOther, may be optionally set. That is, only if there was an influence of interference power due to the transceiver of the relevant communication system, only if there was an influence of interference power that may not be determined to be caused by the transceiver of what system, or only if there was an influence of interference power due to two or more transceivers, the subfield of a relevant field may be set. If UE can determine (or set, or configure) whether measured reception power or measured interference power or both are related to what transceiver, the MeasResultOther field is not set, and reception power or interference power or both which were measured in a field for a relevant transceiver may be indicated.

Furthermore, in Table 7, the measResultIDC field may be optionally set. In this case, the measResultIDC field may be set only when there was an influence of interference power due to another transceiver within UE.

Unlike in Table 7, all reception power values or interference power values or both of other transceivers within UE may be reported.

Table 8 is yet another embodiment of information about RLF (or wireless communication failure) when UE receives rlf-ReportReq and sends the information about RLF (or wireless communication failure) to an eNB or E-UTRAN in response thereto in a system to which the present invention is applied.

TABLE 8

```
RLF-Report-r9 ::=                     SEQUENCE {
    measResultLastServCell-r9             SEQUENCE {
        rsrpResult-r9                         RSRP-Range,
        rsrqResult-r9                         RSRQ-Range          OPTIONAL
    },
    measResultNeighCells-r9               SEQUENCE {
        measResultListEUTRA-r9                MeasResultList2EUTRA-r9     OPTIONAL,
        measResultListUTRA-r9                 MeasResultList2UTRA-r9      OPTIONAL,
        measResultListGERAN-r9                MeasResultListGERAN         OPTIONAL,
        measResultsCDMA2000-r9                MeasResultList2CDMA2000-r9  OPTIONAL
    } OPTIONAL,
    measResultIDC-r10                     SEQUENCE {
        measResultWLAN                        MeasResultWLAN              OPTIONAL,
        measResultBT                          MeasResultBT                OPTIONAL,
        measResultGPS                         MeasResultGPS               OPTIONAL,
        measResultOther                       MeasResultOther             OPTIONAL
    } OPTIONAL,
    ...,
        previousPCellId    CellGlobalIdEUTRA                              OPTIONAL
```

TABLE 8-continued

```
}
MeasResultWLAN ::=   SEQUENCE {
    measResult                         SEQUENCE {
        ReceivedPowerWLAN Result       RSRP-Range              OPTIONAL,
        ReceivedQualWLAN Result        RSRQ-Range              OPTIONAL,
        ReceivedPowerFrom_WLAN         WLAN_RP-Range           OPTIONAL,
        ReceivedQualFrom_WLAN          WLAN_RQ-Range           OPTIONAL,
        ...,
    }
}
MeasResultBT ::=  SEQUENCE {
    BT_Hopping_pattern_length          integer(0...1024)       OPTIONAL,
    measResult                         SEQUENCE {
        ReceivedPowerBT Result         RSRP-Range              OPTIONAL,
        ReceivedQualBT Result          RSRQ-Range              OPTIONAL,
        ReceivedPowerFrom_BT           BT_RP-Range             OPTIONAL,
        ReceivedQualFrom_BT            BT_RQ-Range             OPTIONAL,
        BT_Hopping_pattern             Bitmap(BT_Hopping_pattern_length)OPTIONAL,
        ...,
    }
}
MeasResultGPS ::=    SEQUENCE {
    measResult                         SEQUENCE {
        ReceivedPowerGPS Result        RSRP-Range              OPTIONAL,
        ReceivedQualGPS Result         RSRQ-Range              OPTIONAL,
        ReceivedPowerFrom_GPS          GPS_RP-Range            OPTIONAL,
        ReceivedQualFrom_GPS           GPS_RQ-Range            OPTIONAL,
        ...,
    }
}
MeasResultOther ::= SEQUENCE {
    measResult                         SEQUENCE {
        ReceivedPowerOther_Result      RSRP-Range              OPTIONAL,
        ReceivedQualOther Result       RSRQ-Range              OPTIONAL,
        ...,
    }
}
```

In the RLF report of Table 8, whether there was an influence of interference power due to other transceivers within UE may be indicated through the measResultIDC field. For example, whether there was an influence of interference power due to other transceivers within UE may be indicated by transceiver through the subfields of the measResultIDC field.

Unlike in Table 7, in Table 8, each of the subfields of the measResultIDC field may be used to indicate whether there was an influence of interference power due to the transceiver of a communication system based on the result of measurement for the communication system.

More specifically, in the RLF report of Table 8, each of the subfields of the measResultIDC field may indicate a measurement value for each of other transceivers within UE.

For example, when the subfield (i.e., measResultWLAN) of the measResultIDC field indicates its lower subfield MeasResultWLAN, the result of measurement may be indicated by the subfields (i.e., ReceivedPowerWLAN_Result, ReceivedQualWLAN_Result, ReceivedPowerFrom_WLAN, and ReceivedQualFrom_WLAN) of the lower subfield MeasResultWLAN.

Likewise, when the subfield (i.e. measResultBT) of the measResultIDC field indicates its lower subfield MeasResultBT, the result of measurement may be indicated by the subfields (i.e., ReceivedPowerBT_Result, ReceivedQualBT_Result, ReceivedPowerFrom_BT, ReceivedQualFrom_BT, BT_Hopping_pattern_length, and BT_Hopping_Pattern) of the lower subfield MeasResultBT. When the subfield (i.e. measResultGPS) of the measResultIDC field indicates its lower subfield MeasResultGPS, the result of measurement may be indicated by the subfields (i.e., ReceivedPowerGPS_Result, ReceivedQualGPS_Result, ReceivedPowerFrom_GPS, and ReceivedQualFrom_GPS) of the lower subfield MeasResultGPS.

Here, when there was an influence of interference power that may not be determined to be caused by the transceiver of what system or when there was an influence of interference power due to two or more transceivers, the subfield (i.e., measResultOther) of the measResultIDC field may indicate a lower subfield MeasResultOther so that the result of measurement is indicated by the subfields (i.e., ReceivedPowerOther_Result and ReceivedQualOther_Result) of the lower subfield MeasResultOther.

Each of the fields in Table 8 is described below in relation to a measurement is value regarding a WLAN transceiver within UE.

Fields for a WLAN System within UE

ReceivedPowerWLAN_Result indicates a value of the reception power intensity of a WLAN signal now received within the band of a wireless communication system (i.e., LTE), which was measured using a signal measurement method now operating in the wireless communication system. Here, a method of representing the ReceivedPowerWLAN_Result value may be specified. For example, the method may be represented in a Reference Signal Received Power (RSRP) range.

For example, the RSRP-range may be set to any one of integer values 0 to 97. The values of the RSRP-range correspond to respective values defined in Table 9.

TABLE 9

| RSRP Range Value | Measured RSRP Value | Unit |
|---|---|---|
| RSRP_00 | RSRP < −140 | dBm |
| RSRP_01 | −140 ≤ RSRP < −139 | dBm |
| RSRP_02 | −139 ≤ RSRP < −138 | dBm |
| ... | ... | ... |
| RSRP_95 | −46 ≤ RSRP < −45 | dBm |

TABLE 9-continued

| RSRP Range Value | Measured RSRP Value | Unit |
|---|---|---|
| RSRP_96 | −45 ≤ RSRP < −44 | dBm |
| RSRP_97 | −44 ≤ RSRP | dBm |

ReceivedQualWLAN_Result indicates a value of the reception power intensity of a WLAN signal, now received within the band of a wireless communication system (i.e., LTE), to the reception power intensities of all signals now received within the band of the wireless communication system, which was measured using a signal measurement method now operating in the wireless communication system. Here, a method of representing the ReceivedQualW-LAN_Result value may be specified. For example, the method may be represented in a Reference Signal Received Quality (RSRQ) range.

For example, the RSRQ-range may be set to any one of integer values 0 to 34. The values of the RSRQ-range correspond to respective values defined in Table 10.

TABLE 10

| RSRQ-range value | Measured RSRQ value | Unit |
|---|---|---|
| RSRQ_00 | RSRQ < −19.5 | dB |
| RSRQ_01 | −19.5 ≤ RSRQ < −19 | dB |
| RSRQ_02 | −19 ≤ RSRQ < −18.5 | dB |
| ... | ... | ... |
| RSRQ_32 | −4 ≤ RSRQ < −3.5 | dB |
| RSRQ_33 | −3.5 ≤ RSRQ < −3 | dB |
| RSRQ_34 | −3 ≤ RSRQ | dB |

ReceivedPowerFrom_WLAN indicates a value of the reception power intensity of a WLAN signal now received within the band of a wireless communication system (i.e., LTE), which was measured using a signal measurement method now operating in a WLAN system. Here, a method of representing the ReceivedPowerFrom_WLAN value may be specified. For example, the method may be specified so that a range of values (WLAN_RP—range) used to measure reception power in a WLAN system is represented.

ReceivedQualFrom_WLAN indicates a value of the reception power intensity of a WLAN signal, now received within the band of a wireless communication system (i.e., LTE), to the reception power intensities of all signals now received within the band of the wireless communication system, which was measured using a signal measurement method now operating in a WLAN system. Here, a method of representing the ReceivedQualFrom_WLAN value may be specified. For example, the method may be specified so that a range of values (WLAN_RQ-range) used to measure reception quality in a WLAN system is represented.

Fields for a BT System within UE

A BT_Hopping_pattern_length field indicates the length of a frequency hopping pattern that is used by a BT device now operating within UE. The length of the hopping pattern may be determined by a BT standard. For example, the length of the hopping pattern may be determined to have an integer value of a specific range. In contrast, if the frequency hopping pattern used in the BT standard is indicated in the form of an index, the BT_Hopping_pattern_length field may be recognized and used as a field for indicating an index value. In this case, UE previously knows pieces of frequency hopping pattern information corresponding to an index used in the BT standard.

ReceivedPowerBT_Result indicates a value of the reception power intensity of a BT signal now received within the band of a wireless communication system (i.e., LTE), which was measured using a signal measurement method now operating in the wireless communication system. Here, a method of representing the ReceivedPowerBT_Result value may be specified. For example, the method may be specified so that an RSRP range is represented.

ReceivedQualBT_Result indicates a value of the reception power intensity of a BT signal, now received within the band of a wireless communication system (i.e., LTE), to the reception power intensities of all signals now received within the band of the wireless communication system, which was measured using a signal measurement method now operating in the wireless communication system. Here, a method of representing the ReceivedQualBT_Result value may be specified. For example, the method may be specified so that an RSRQ range is represented.

ReceivedPowerFrom_BT indicates a value of the reception power intensity of a BT signal now received within the band of a wireless communication system (i.e., LTE), which was measured using a signal measurement method now operating in a BT system. Here, a method of representing the ReceivedPowerFrom_BT value may be specified. For example, the method may be specified so that a range of values (BT_RP-range) used to measure reception power in the BT system is represented.

ReceivedQualFrom_BT is a value of the reception power intensity of a BT signal, now received within the band of a wireless communication system (i.e., LTE), to the reception power intensities of all signals now received within the band of the wireless communication system, which was measured using a signal measurement method now operating in a BT system. Here, a method of representing the ReceivedQualFrom_BT value may be specified. For example, the method may be specified so that a range of values (BT_RQ-range) used to measure reception quality in the BT system is represented.

BT_Hopping_pattern indicates frequency hopping pattern information used by a BT device now operating within UE. Here, the length of the hopping pattern may be determined by the BT standard. The frequency hopping pattern of the BT device indicated by the BT_Hopping_pattern field may be represented in the form of a bitmap. For example, when bit information is '1', it means that hopping is performed in a + direction by a predetermined frequency band. When bit information is '0', it means that hopping is performed in a − direction by a predetermined frequency band. Alternatively, 2 bits or more may be determined as a piece of hopping information in order to represent a hopping pattern.

For example, if 2 bits is determined to be a piece of hopping information, hopping may be represented in 4 steps (e.g., [00, 01, 10, 11]={−2, −1, 1, 2}). If 4 bits is is determined to be a piece of hopping information, hopping may be represented in 16 steps. The hopping information for the bits may be independently set with reference to the BT standard in a wireless communication system (i.e., LTE) in which UEs that may now have ICO exist and in which a license band is used. In contrast, if a frequency hopping pattern used in the BT standard is indicated in the form of an index, the BT_Hopping_pattern field is not used.

Field for a GPS System within UE

ReceivedPowerGPS_Result indicates a value of the reception power intensity of a GPS signal now received within the band of a wireless communication system (i.e., LTE), which was measured using a signal measurement method now operating in the wireless communication system. Here, a method of representing the ReceivedPowerGPS_Result value may be specified. For example, the method may be specified so that an RSRP-range is represented.

ReceivedQualGPS_Result indicates a value of the reception power intensity of a GPS signal, now received within the band of a wireless communication system (i.e., LTE), to the reception power intensities of all signals now received within the band of the wireless communication system, which was measured using a signal measurement method now operating in the wireless communication system. Here, a method of representing the ReceivedQualGPS_Result value may be specified. For example, the method may be specified so that an RSRQ-range is represented.

ReceivedPowerFrom_GPS indicates a value of the reception power intensity of a GPS signal now received within the band of a wireless communication system, which was measured using a signal measurement method now operating in a GPS system. Here, a method of representing the ReceivedPowerFrom_GPS value may be specified. For example, the method may be specified so that a range of values (GPS_RP-range) used to measure reception power in a WLAN system is represented.

ReceivedQualFrom_GPS indicates a value of the reception power intensity of a GPS signal, now received within the band of a wireless communication system (i.e., LTE), to the reception power intensities of all signals now received within the band of the wireless communication system, which was measured using a signal measurement method now operating in a GPS system. Here, a method of representing the ReceivedQualFrom_GPS value may be specified. For example, the method may be specified so that a range of values (GPS_RQ-range) used to measure reception quality in a GPS system is represented.

Other Fields

ReceivedPowerOther_Result may be used to indicate a measurement value for interference power that may not be determined to be caused by the receiver of what system or for interference power due to two or more transceivers. ReceivedPowerOther_Result indicates a value of the reception power intensities of signals other than an LTE signal, from among signals now received within the band of a wireless communication system (i.e., LTE), which was measured using a signal measurement method now operating in the wireless communication system. Here, a method of representing the ReceivedPowerOther_Result value may be specified. For example, the method may be specified so that an RSRP-range is represented.

ReceivedQualOther_Result may be used to indicate a measurement value for interference power that may not be determined to be caused by the receiver of what system or for interference power due to two or more transceivers. ReceivedQualOther_Result indicates a value of the reception power intensities of signals other than an LTE signal, from among signals now received within the band of a wireless communication system (i.e., LTE), to the reception power intensities of all signals now received within the band of the wireless communication system, which was measured using a signal measurement method now operating in the wireless communication system. Here, a method of representing the ReceivedOtherGPS_Result value may be specified. For example, the method may be specified so that an RSRQ-range is represented.

Meanwhile, in Table 8, examples in which an influence of interference power due is to other transceivers within UE is indicated by a measurement value have been described. Alternatively, a measurement value to be indicated may be optionally set only when the measurement value exists.

For example, a field indicating a measurement value, such as ReceivedPowerWLAN_Result, may be optionally set. That is, if relevant measurement is not performed, a measurement value is 0, or a measurement value does not reach a meaningful critical value, a relevant field may not be set.

Furthermore, fields (e.g., measResultWLAN, measResultBT, measResultGPS, and measResultOther) for the transceiver of a specific communication system within UE may be optionally set. That is, if measurement is not performed on a relevant system, a measurement value is 0, or a measurement value does not reach a meaningful critical value, a relevant field may not be set.

Furthermore, a field (e.g., measResultIDC) for the transceiver of another communication system within UE may also be optionally set. That is, if an influence of interference power due to the transceiver of another communication system within UE does not exist or the influence does not reach a meaningful critical value, the measResultIDC field may not be set.

(2) When UE receives logMeasReportReq

Table 11 is an embodiment of information about RLF (or wireless communication failure) when UE receives logMeasReportReq and sends the information about wireless communication failure to an eNB or E-UTRAN in response thereto in a system to which the present invention is applied. Here, the information about wireless communication failure may be information on which the UE is logged through an MDT. Table 11 shows an example in which ICO-RLF information is used to report whether there was an influence of interference power due to other transceivers within UE.

TABLE 11

```
LogMeasInfo-r10 ::=    SEQUENCE {
    locationInfo-r10                    LocationInfo-r10   OPTIONAL,
    relativeTimeStamp-r10               INTEGER (0..7200),
    servCellIdentity-r10                CellGlobalIdEUTRA,
    measResultServCell-r10              SEQUENCE {
        rsrpResult-r10                      RSRP-Range,
        rsrqResult-r10                      RSRQ-Range
    },
    measResultNeighCells-r10            SEQUENCE {
        measResultListEUTRA-r10             MeasResultList2EUTRA-r9       OPTIONAL,
        measResultListUTRA-r10              MeasResultList2UTRA-r9        OPTIONAL,
        measResultListGERAN-r10             MeasResultList2GERAN-r10      OPTIONAL,
        measResultListCDMA2000-r10          MeasResultList2CDMA2000-r9    OPTIONAL
    }   OPTIONAL,
    measResultIDC-r10       Boolean                                       OPTIONAL,
    ...,
}
```

In Table 11, measResultIDC indicates whether there was an influence of interference power due to other transceivers within UE. For example, if a value of measResultIDC is True, it may indicate that there was an influence of interference due to other transceivers within UE. If the value of measResultIDC is False, it may indicate that there was no influence of interference due to other transceivers within UE. Here, measResultIDC may be optionally added. Thus, measResultIDC may be set only when there was an influence of interference due to other transceivers within UE.

Unlike in Table 11, whether there was an influence of interference power due to other transceivers within UE may be reported by transceiver.

Table 12 is another embodiment of information about wireless communication failure when UE receives logMeasReportReq and sends the information about RLF (or wireless communication failure) to an eNB or E-UTRAN in response thereto in a system to which the present invention is applied. Here, the information about RLF (or wireless communication failure) may be information on which the UE is logged through an MDT. Table 12 shows an example in which ICO-RLF information is used to report whether there was an influence of interference power due to other transceivers within UE by transceiver.

TABLE 12

```
LogMeasInfo-r10 ::=    SEQUENCE {
        locationInfo-r10                        LocationInfo-r10    OPTIONAL,
        relativeTimeStamp-r10                   INTEGER (0..7200),
        servCellIdentity-r10                    CellGlobalIdEUTRA,
        measResultServCell-r10                  SEQUENCE {
            rsrpResult-r10                          RSRP-Range,
            rsrqResult-r10                          RSRQ-Range
        },
        measResultNeighCells-r10                SEQUENCE {
            measResultListEUTRA-r10                 MeasResultList2EUTRA-r9         OPTIONAL,
            measResultListUTRA-r10                  MeasResultList2UTRA-r9          OPTIONAL,
            measResultListGERAN-r10                 MeasResultList2GERAN-r10        OPTIONAL,
            measResultListCDMA2000-r10              MeasResultList2CDMA2000-r9      OPTIONAL
        }  OPTIONAL,
    measResultIDC-r10                           SEQUENCE {
            measResultWLAN                          Boolean                         OPTIONAL,
            measResultBT                            Boolean                         OPTIONAL,
            measResultGPS                           Boolean                         OPTIONAL,
            measResultOther                         Boolean                         OPTIONAL
        }  OPTIONAL,
        ...,
}
```

In the RLF report of Table 12, a measResultIDC field may indicate whether there was an influence of interference power due to other transceivers within UE. For example, the subfields of the measResultIDC field may be used to indicate whether there was an influence of interference power due to other transceivers within UE by transceiver. More specifically, as in Table 7, whether there was an influence of interference power due to other transceivers within UE may be indicated depending on whether the value of each of the subfields of the measResultIDC field is True or False.

Meanwhile, unlike in Table 12 in which only whether there was an influence of interference power due to other transceivers within UE is reported through ICO-RLF information, all reception power values or interference power values or both of other transceivers within UE may be reported.

Table 13 is an embodiment of information about RLF (or wireless communication failure) when UE receives logMeasReportReq and sends the information about RLF (or wireless communication failure) to an eNB or E-UTRAN in response thereto in a system to which the present invention is applied. Table 13 shows an example in which ICO-RLF information is includes reception power values or interference power values of other transceivers within UE.

TABLE 13

```
LogMeasInfo-r10 ::=    SEQUENCE {
        locationInfo-r10                        LocationInfo-r10,   OPTIONAL
        relativeTimeStamp-r10                   INTEGER (0..7200),
        servCellIdentity-r10                    CellGlobalIdEUTRA,
        measResultServCell-r10                  SEQUENCE {
            rsrpResult-r10                          RSRP-Range,
            rsrqResult-r10                          RSRQ-Range
```

TABLE 13-continued

```
    },
    measResultNeighCells-r10        SEQUENCE {
        measResultListEUTRA-r10         MeasResultList2EUTRA-r9     OPTIONAL,
        measResultListUTRA-r10          MeasResultList2UTRA-r9      OPTIONAL,
        measResultListGERAN-r10         MeasResultList2GERAN-r10    OPTIONAL,
        measResultListCDMA2000-r10      MeasResultList2CDMA2000-r9  OPTIONAL
    } OPTIONAL,
    measResultIDC-r10               SEQUENCE {
        measResultWLAN                  MeasResultWLAN              OPTIONAL,
        measResultBT                    MeasResultBT                OPTIONAL,
        measResultGPS                   MeasResultGPS               OPTIONAL,
        measResultOther                 MeasResultOther             OPTIONAL
    } OPTIONAL,
    ...,
}
MeasResultWLAN ::= SEQUENCE {
    measResult                      SEQUENCE {
        ReceivedPowerWLAN_Result        RSRP-Range                  OPTIONAL,
        ReceivedQualWLAN_Result         RSRQ-Range                  OPTIONAL,
        ReceivedPowerFrom_WLAN          WLAN RP-Range               OPTIONAL,
        ReceivedQualFrom WLAN           WLAN RQ-Range               OPTIONAL,
        ...,
    }
}
MeasResultBT ::= SEQUENCE {
    BT Hopping pattern length       integer(0...1024)               OPTIONAL,
    measResult                      SEQUENCE {
        ReceivedPowerBT Result          RSRP-Range                  OPTIONAL,
        ReceivedQualBT_Result           RSRQ-Range                  OPTIONAL,
        ReceivedPowerFrom_BT            BT_RP-Range                 OPTIONAL,
        ReceivedQualFrom_BT             BT_RQ-Range                 OPTIONAL,
        BT Hopping pattern              Bitmap(BT Hopping pattern length)OPTIONAL,
        ...,
    }
}
MeasResultGPS ::= SEQUENCE {
    measResult                      SEQUENCE {
        ReceivedPowerGPS Result         RSRP-Range                  OPTIONAL,
        ReceivedQualGPS_Result          RSRQ-Range                  OPTIONAL,
        ReceivedPowerFrom_GPS           GPS_RP-Range                OPTIONAL,
        ReceivedQualFrom GPS            GPS RQ-Range                OPTIONAL,
        ...,
    }
}
MeasResultOther ::= SEQUENCE {
    measResult                      SEQUENCE {
        ReceivedPowerOther Result       RSRP-Range                  OPTIONAL,
        ReceivedQualQther Result        RSRQ-Range                  OPTIONAL,
        ...,
    }
}
```

In the RLF report of Table 13, a measResultIDC field may be used to indicate whether there was an influence of interference power due to other transceivers within UE. For example, whether there was an influence of interference power due to other transceivers within UE may be indicated by transceiver through the subfields of the measResultIDC field. Unlike in Table 12, in Table 13, each of the subfields of the measResultIDC field may be used to indicate whether there was an influence of interference power due to the transceiver of a communication system based on the result of measurement for the communication system.

More specifically, in the RLF report of Table 13, each of the subfields of the measResultIDC field may indicate a measurement value for each of transceivers within UE.

For example, when the subfield (i.e., measResultWLAN) of the measResultIDC field indicates its lower subfield MeasResultWLAN, the subfields (i.e., ReceivedPowerWLAN_Result, ReceivedQualWLAN_Result, ReceivedPowerFrom_WLAN, and ReceivedQualFrom_WLAN) of the lower subfield MeasResultWLAN may indicate the result of measurement.

Likewise, when the subfield (i.e., measResultBT) of the measResultIDC fields indicates its lower subfield MeasResultBT, the subfields (i.e., ReceivedPowerBT_Result, ReceivedQualBT_Result, ReceivedPowerFrom_BT, ReceivedQualFrom_BT, BT_Hopping_pattern_length, and BT_Hopping_Pattern) of the lower subfield MeasResultBT may indicate the result of measurement. When the subfield (i.e., measResultGPS) of the measResultIDC field indicates its lower subfield MeasResultGPS, the subfields (i.e., ReceivedPowerGPS_Result, ReceivedQualGPS_Result, ReceivedPowerFrom_GPS, and ReceivedQualFrom_GPS) of the lower subfield MeasResultGPS may indicate the result of measurement.

Here, when there was an influence of interference power that may not be determined to be caused by the transceiver of what system or when there was an influence of interference power due to two or more transceivers, a subfield (i.e., measResultOther) of the measResultIDC field may indicate its lower subfield MeasResultOther so that the result of measurement is indicated by the subfields (i.e., ReceivedPowerOther_Result and ReceivedQualOther_Result) of the lower subfield MeasResultOther.

In Table 13, fields indicating reception power or interference power or both which were measured for a WLAN transceiver within UE may be defined in the same manner as the respective fields of Table 8.

Meanwhile, in the embodiments of Tables 6 to 8 and Tables 11 to 13, the RLF is report may be configured such that only whether there was an influence of interference power due to other transceivers within UE may be indicated for some of other transceivers within the UE and reception power values and interference power values may be indicated for some of other transceivers within the UE by transceiver. Furthermore, the RLF report may be configured such that only any one of the reception power and the interference power of a transceiver within UE is indicated, only the reception power is indicated for some of other transceivers within the UE, only the interference power is indicated for some of other transceivers within the UE, and both the reception power and the interference power are indicated for the remaining transceivers.

Furthermore, in the embodiments of Tables 6 to 8 and Tables 11 to 13, an example in which ICO-RLF information is transmitted when rlf-ReportReq or logMeasReportReq is received has been described, but the present invention is not limited thereto. Only when a field to request ICO-RLF information in detail exists on a UE information request message and the ICO-RLF information is requested through a relevant field, UE may include the ICO-RLF information in a UE information response message and then transmit the UE information response message.

Figure 11:
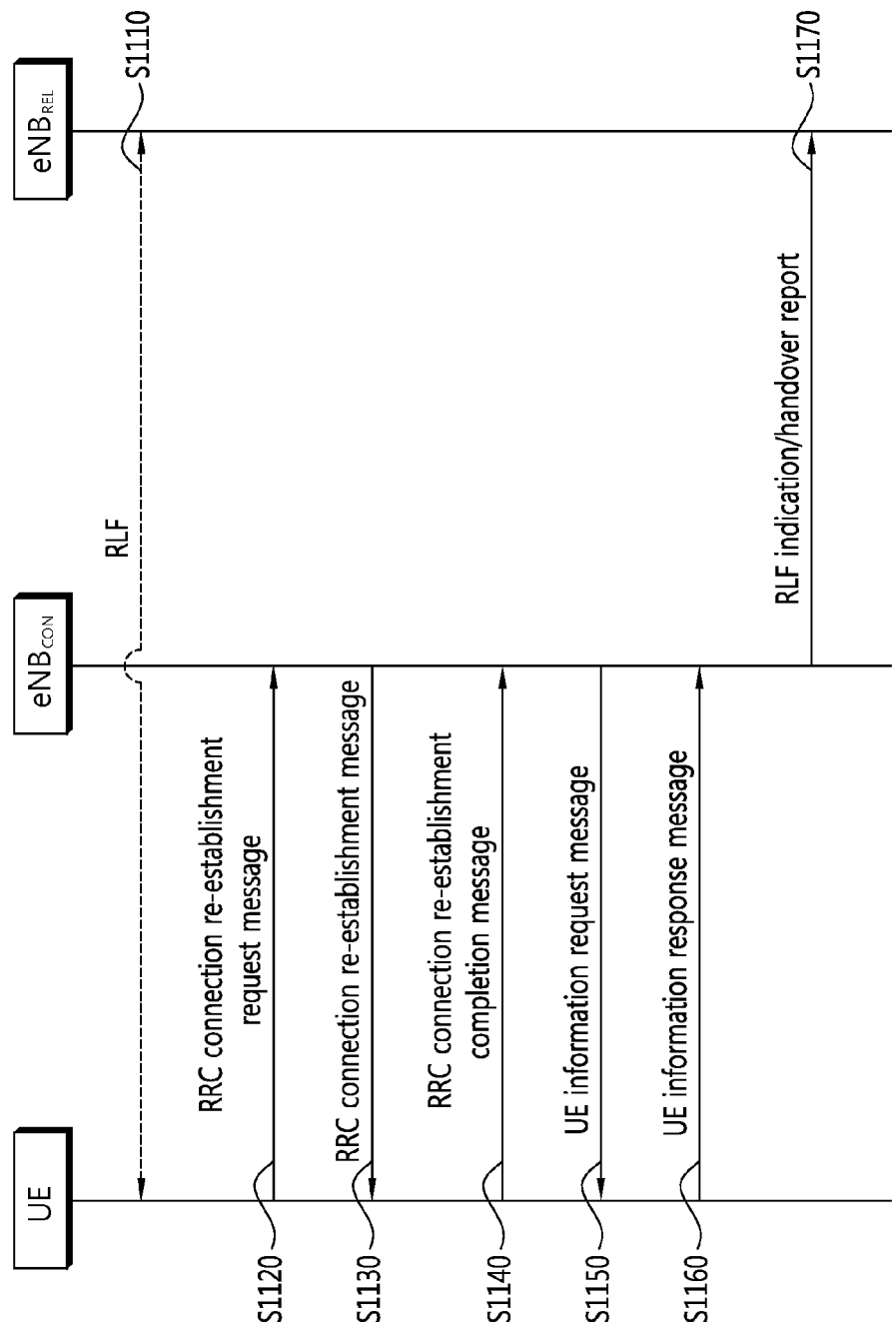
FIG. 11 is a flowchart schematically illustrating an RLF report procedure performed in a system to which the present invention is applied.

FIG. 11 is a flowchart schematically illustrating an RLF report procedure is performed in a system to which the present invention is applied.

Referring to FIG. 11, RLF is generated between UE and an $eNB_{REL}$ at step S1110. Here, the RLF may be caused by interference from an adjacent (heterogeneous) cell or may be generated by an influence of interference due to other transceivers within UE. Furthermore, the RLF may be based on a problem within a network itself.

The UE searches for a suitable cell with which RRC connection will be re-established through cell search.

When an $eNB_{CON}$ is selected as the suitable cell with which RRC connection will be re-established, the UE transmits an RRC connection re-establishment message to the $eNB_{CON}$ at step S1120. If there was temporary RLF after a successful handover, the $eNB_{CON}$ may be an eNB that generated the RLF between the UE and the $eNB_{CON}$. The RRC connection re-establishment message transmitted from the UE to the $eNB_{CON}$ may include RLF information along with pieces of information, such as a UE ID and PCI, as a cause value.

The $eNB_{CON}$ receives the RRC connection re-establishment request message and transmits an RRC connection re-establishment message to the UE at step S1130.

The UE receives the RRC connection re-establishment message, re-establishes RRC connection based on information included in the RRC connection re-establishment is message, and transmits an RRC connection re-establishment completion message to the $eNB_{CON}$ at step S1140.

Through the above-described RRC connection re-establishment procedure, the $eNB_{CON}$ may obtain the RLF information included in the RRC connection re-establishment request message as the cause value.

Furthermore, through the $eNB_{CON}$, in order to obtain necessary information, an E-UTRAN may transmit a UE information request message to the UE at step S1150. The UE information request message may include fields requesting the RLF information, such as rlf-ReportReq and logMeasReportReq.

The UE may check the rlf-ReportReq and logMeasReportReq fields included in the UE information request message, include the RLF information in a UE information response message, and transmit the UE information response message to the $eNB_{CON}$ (i.e., the E-UTRAN) at step S1160.

The $eNB_{CON}$ (i.e., the E-UTRAN) that has obtained the RLF information through the RRC connection re-establishment procedure or the UE information procedure transfers the obtained RLF information to a relevant eNB (i.e., the $eNB_{REL}$) at step S1170. Here, the RLF information may be transferred through an X2 interface.

The $eNB_{REL}$ may be the previous cell or the previous eNB of the UE which may be checked based on a PCI. In this case, the RLF information may be transferred to the $eNB_{REL}$ through an RLF indication.

Furthermore, the RLF information may be transferred to the $eNB_{REL}$ through a handover report. In this case, the $eNB_{REL}$ may be the original source eNB, source cell, or target cell of the UE which is checked based on a PCI.

Meanwhile, if the RLF is caused by ICO not a problem within a network, the $eNB_{CON}$ may transmit the RLF information to the $eNB_{REL}$ only when or if the RLF information is determined to be information necessary for the $eNB_{REL}$.

Figure 12:
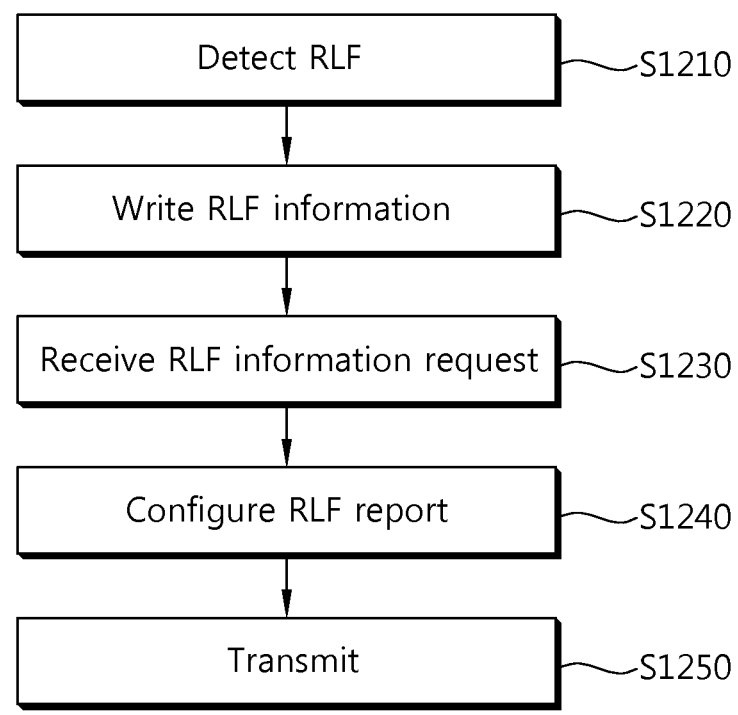
FIG. 12 is a flowchart schematically illustrating a procedure of reporting RLF information, which is performed by UE subjected to RLF in a system to which the present invention is applied.

FIG. 12 is a flowchart schematically illustrating a procedure of reporting RLF information, which is performed by UE subjected to RLF in a system to which the present invention is applied.

Referring to FIG. 12, the UE first detects the occurrence of RLF at step S1210.

At this time, the UE may obtain RLF information and store the RLF information at step S1220. The UE may store the obtained RLF information in each of the fields of VarRLFReport. If the RLF information obtained by the UE was measured in a process of performing an MDT, the UE may store a log, written by the MDT, in each of the fields of VarLogMeasReport.

The UE receives a request to send RLF information through an eNB at step S1230. Here, the eNB may be an eNB with which RRC connection has been re-established after the RLF. Furthermore, the request to send the RLF information may be transmitted with it included in a UE information request message from an E-UTRAN.

The UE configures an RLF report to be transmitted at step S1240. At this time, the UE may configure the RLF report, including not only a cause of the RLF due to a network, but also a cause of the RLF due to ICO.

If information about the ICO is included, the UE may configure the RLF report so that the information about ICO includes only information indicating that there was an influence due to the ICO, information indicating where there was interference from the transceiver of what system within the UE, or the result of measurement regarding interference for each of systems within the UE.

Whether the RLF report will include what information may be previously set in the UE or may be transferred through high layer signalling. Furthermore, necessary information may be designed through the UE information request message from the eNB or an E-UTRAN.

The UE transmits the configured RLF information to the eNB (or the E-UTRAN) at step S1250. Here, the RLF information may be transferred to the E-UTRAN side through the eNB. If the UE receives the request to send the information about RLF through the UE information request message, the UE may include the RLF information in a UE information response message and then transmit the UE information response message.

Furthermore, the eNB to which the RLF information is transmitted from the UE may be an eNB with which RRC connection will be re-established. In this case, the UE may transmit an RRC connection re-establishment request message, including the RLF information as a cause value, to the eNB without the request from the eNB (that is, the step S1230).

Meanwhile, an example in which UE receives a UE information request message and configures an RLF report has been described, but the present invention is not limited thereto. Although the UE information request message is not received, UE that has detected RLF may write the RLF report. In this case, the UE may transmit the RLF report which is written as a response to the UE information request message or which is included in an RRC connection re-establishment request message.

Figure 13:
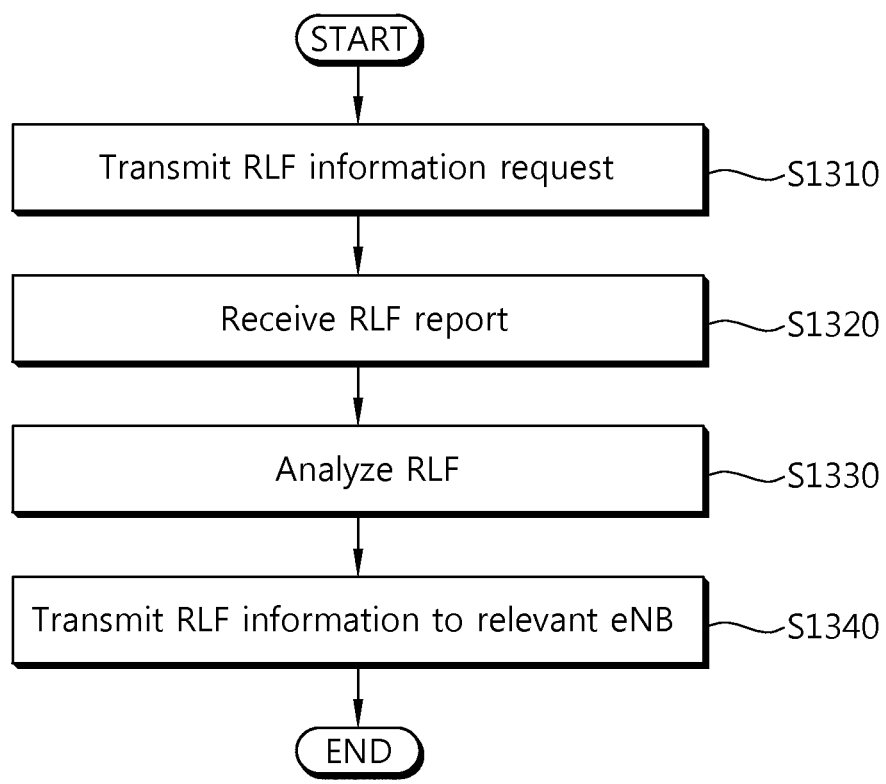
FIG. 13 is a flowchart schematically illustrating the operation of an eNB which receives RLF information in a system to which the present invention is applied.

FIG. 13 is a flowchart schematically illustrating the operation of an eNB which receives RLF information in a system to which the present invention is applied.

Referring to FIG. 13, the eNB may transmit a message, requesting information about RLF (or wireless communication failure), to UE where wireless communication failure has been generated at step S1310. The eNB which has set up RRC connection with the UE where RLF (or wireless communication failure) has been generated may request the information about RLF (or wireless communication failure) through a UE information request message.

The eNB receives an RLF report from the UE at step S1320. The RLF report received from the UE is a response to the UE information request message, and it may be included in a UE information response message and then transmitted.

Meanwhile, the UE may report RLF information even without receiving the UE information request message. That is, the eNB may receive the RLF information from the UE without performing the step S1310. In this case, the RLF information may be included in an RRC connection re-establishment request message from the UE as a cause value for an RRC connection re-establishment request and may be then transmitted.

The eNB analyzes the RLF information received from the UE at step S1330. The eNB may check the ID of a serving cell where RLF was generated and check a cause of the RLF.

The eNB transmits the RLF information to a relevant eNB at step S1340. The is relevant eNB may be the previous cell or the previous eNB of the UE which may be checked based on a PCI. In this case, the RLF information may be transferred through an RLF indication. Furthermore, the RLF information may also be transferred through a handover report. In this case, the relevant eNB may be the original source eNB, source cell, or target cell of the UE which is checked based on the PCI.

Meanwhile, if the RLF is caused by ICO not a problem within a network, the eNB may transmit the RLF information to the relevant eNB only when or if the RLF information is determined to be information necessary for the relevant eNB.

Figure 14:
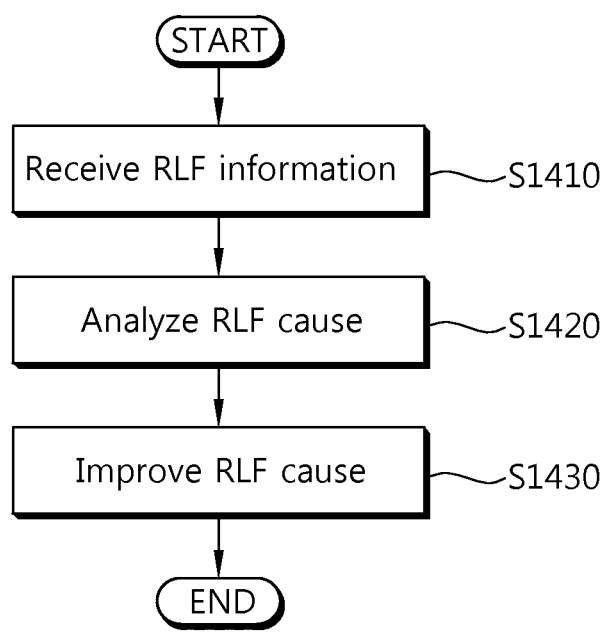
FIG. 14 is a flowchart schematically illustrating an operation performed by an eNB where RLF had occurred based on RLF information in a system to which the present invention is applied.

FIG. 14 is a flowchart schematically illustrating an operation performed by an eNB where RLF had occurred based on RLF information in a system to which the present invention is applied.

Referring to FIG. 14, the eNB where RLF had occurred receives RLF information at step S1410. The RLF information may be received from an eNB which has newly set up RRC connection with UE where the RLF had occurred through an RLF indication or a handover report.

The eNB where the RLF had occurred may analyze a cause of the RLF by analyzing the RLF information at step S1420.

The eNB where the RLF had occurred improves the cause of the RLF on the basis of the analyzed cause of the RLF at step S1430. The RLF may be based on several causes. If the cause of the RLF is caused by a network, such as inter-cell interference, the eNB may incorporate the relevant cause so that a system is operated. Furthermore, if the cause of the RLF is a cause (e.g., ICO) within UE, the cause of the RLF may be utilized as information about the UE when RRC connection with the UE is re-established through a handover.

Figure 15:
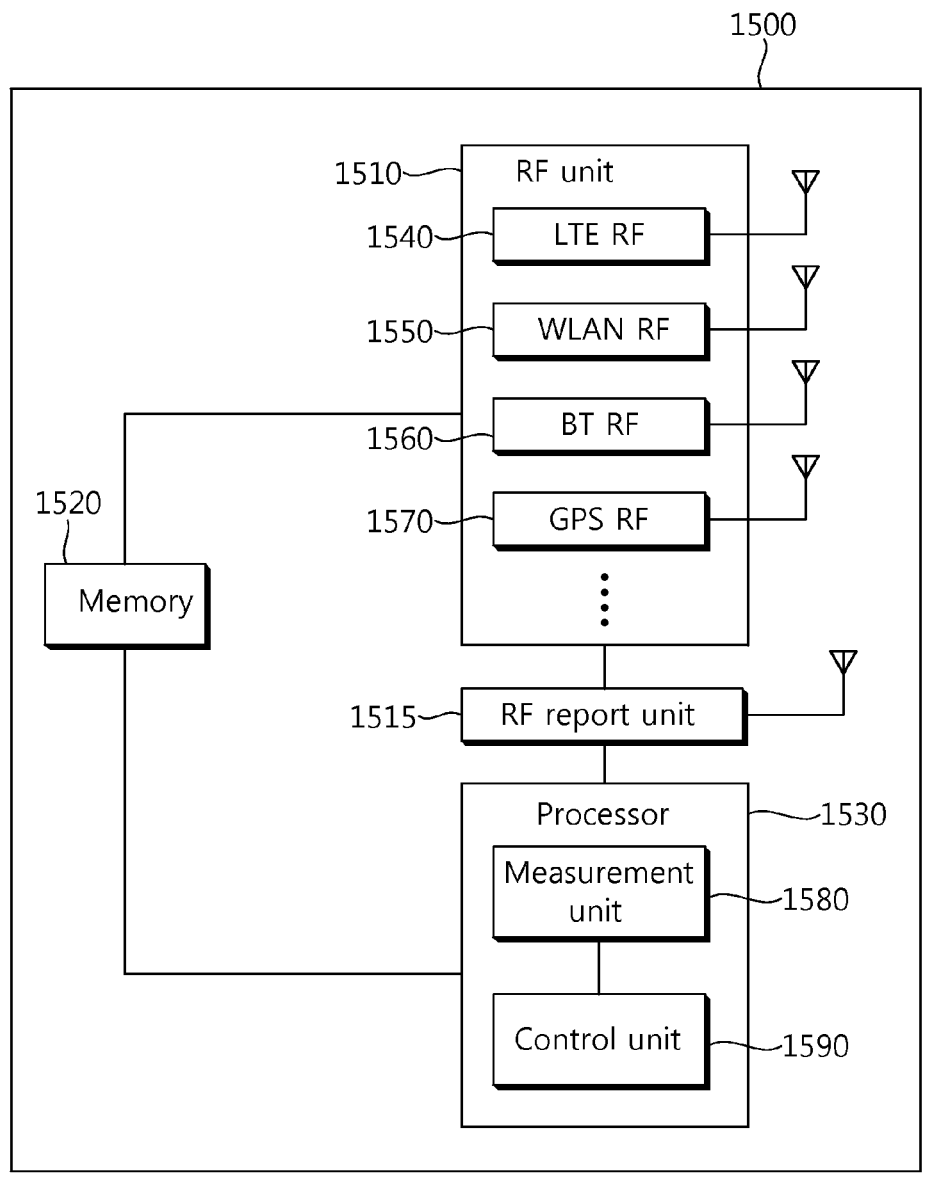
FIG. 15 is a block diagram schematically illustrating the construction of UE in a system to which the present invention is applied.

FIG. 15 is a block diagram schematically illustrating the construction of UE in a system to which the present invention is applied.

Referring to FIG. 15, the UE 1500 includes an RF unit 1510, RF report unit 1515, memory 1520, and a processor 1530. RF report unit 1515 may be included in RF unit 1510, or be placed out of RF unit 1510 separately.

The UE 1500 transmits and receives necessary information through the RF unit 1510. The UE 1500 may support a variety of communication systems. The RF unit 1510 may include a plurality of RF units for the respective systems so that the UE 1500 may use the variety of communication systems. For example, the RF unit 1510 may include an RF unit 1540 for an LTE system, an RF unit 1550 for a WLAN system, an RF unit 1560 for a BT system, an RF unit 1570 for a GPS, and so on.

The RF units 1540 and 1560 for the LTE system and the WLAN system use bands regulated in the respective systems, but interference due to ICO may be generated between the RF units 1540 and 1560 within the same UE as described above.

The memory 1520 stores information necessary for the UE 1500 to perform communication. For example, the memory 1520 may store information about a network state or channel state through measurement and store a log written through an MDT. Furthermore, the memory 1520 may store information about RLF when the RLF is generated. If the information about RLF is measured through an MDT, the information about RLF may be written in the form of a log and then stored.

The processor 1530 includes a measurement unit 1580 and a control unit 1590. The processor 1530 is coupled to the RF unit 1510 and the memory 1520, and it may control the RF unit 1510 and the memory 1520 through the control unit 1590.

The measurement unit 1580 performs measurement for determining a network state, a channel state, etc. Communication systems supported by the UE 1500 regulate measurement methods for the respective communication systems. The measurement unit 1580 may measure the intensities of signals received through the respective RF units 1540 and 1560 according to the measurement methods for the respective communication systems. Furthermore, the measurement unit 1580 may also measure a signal of a relevant system which is received within the band of the heterogeneous system in order to determine an influence due to ICO. For example, an influence of the heterogeneous system may be measured in such a way as to discard a predetermined reception signal having a specific band of the relevant system from a signal received within the specific band.

The measurement unit 1580 may measure a situation of UE or a system when RLF was generated. The result of measurement by the measurement unit 1580 is stored in the memory 1520.

The control unit 1590 may determine whether RLF has occurred by determining the result of measurement by the measurement unit 1580 or a wireless communication situation. The control unit 1590 may write an RLF report. At this time, the control unit 1590 may write the RLF report on the basis of the result of measurement by the measurement unit 1580.

The RF report unit 1515 may transmit the RLF report, written in response (e.g., a UE information request received from an E-UTRAN) to a UE information request message or included in an RRC connection re-establishment request message, through the RF unit 1510. The RLF report may be configured in response to an RLF information request received from an eNB or may be configured according to a predetermined method.

For example, the control unit 1590 may determine whether only information about the existence of ICO will be included, whether information about the existence of interference for each system will be included, or whether a measurement value (e.g., RSRP or RSRQ) for each system will be included in response to a request from an eNB or predetermined setting regarding the ICO and may write the RLF report based on the determination. The measurement value may be represented in a RSRP range or a RSRQ range.

Figure 16:
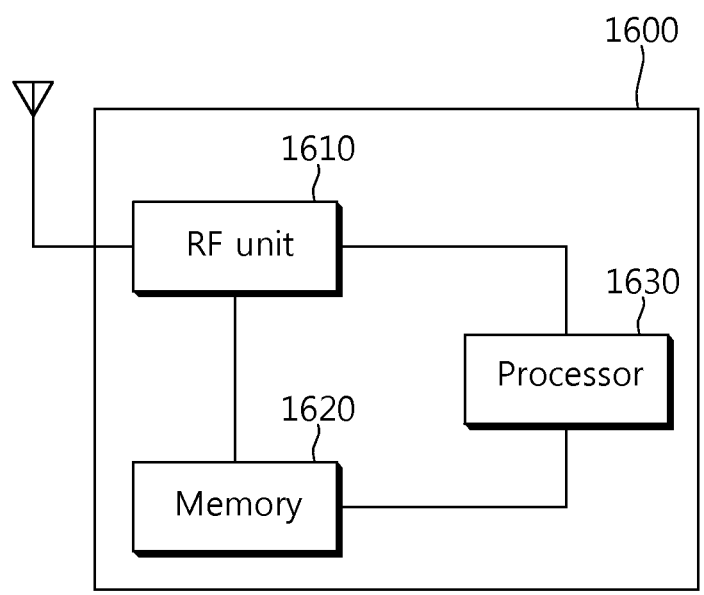
FIG. 16 is a block diagram schematically illustrating the construction of an eNB in a system to which the present invention is applied.

FIG. 16 is a block diagram schematically illustrating the construction of an eNB in a system to which the present invention is applied.

Referring to FIG. 16, the eNB 1600 includes an RF unit 1610, memory 1620, and a processor 1630.

The eNB 1600 transmits and receives necessary information through the RF unit 1610.

RF unit 1610 receives an RLF report which comprises information indicating which communication system is the communication system that generates ICO, and a measurement value of reception power or interference power of a signal of the communication system that generates the ICO, if there is an influence of the ICO of a UE to the RLF, from the UE RF unit 1610 transmits information about the RLF to a cell where the RLF was occurred based on the RLF report, RF unit 1610 transmits ICO information of the UE only when a cell where the RLF was occurred requires information about the ICO, if the RLF report includes the ICO information of the UE regarding the RLF.

The memory 1620 stores information necessary for a system operation. For example, the memory 1620 may store information for RRC connection re-establishment. The information for RRC connection re-establishment may include the ID of the previous cell of UE which wishes to re-establish RRC connection, a PCI, and RLF information as a cause value for RRC connection re-establishment. Furthermore, the memory 1620 may store RLF information within a UE information response message received as a response to a UE information request message.

The processor 1630 may perform an RRC connection re-establishment procedure between the eNB and UE. The processor 1630 may analyze RLF information about UE which is received from the UE and transmit the RLF information to a relevant eNB. Furthermore, the processor 1630 may analyze RLF information about UE where RLF had occurred between the UE and the eNB when the RLF information of the UE is received and may improve a cause of is the RLF. The processor 1630 may transmit a UE information request message to UE when a UE information request is received from an E-UTRAN.

In accordance with the present invention, RLF information can be accurately reported according to a cause of RLF, and network quality can be effectively improved because the RLF information is shared in a network.

In accordance with the present invention, RLF due to interference resulting from the transceivers of different communication systems within UE can be reported. At this time, a reception power value or an interference power value or both which were measured by the transceiver of each system may be included in the RLF information in addition to information indicating that the interference was generated by the transceivers of the different systems. Accordingly, a more accurate RLF report can be performed.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present is invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. A method of User Equipment (UE) reporting Radio Link Failure (RLF) in a wireless communication system, the method comprising:
   detecting an RLF;
   configuring an RLF report concerning the RLF; and
   transmitting the RLF report to an eNodeB (eNB),
   wherein if there is an influence of In-device COexistence interference (ICO) of the UE to the RLF, the RLF report comprises information indicating which communication system is the communication system that generates the ICO, and a measured value of reception power or interference power of a signal of the communication system that generates the ICO,
   wherein the RLF report is transmitted as a response to a UE information request received from an Evolved-Universal Terrestrial Radio Access Network (E-UTRAN),
   a message including the UE information request includes a field to request RLF information, and
   the field to request the RLF information is a field to instruct a report of logged measurement information or a field to indicate whether the RLF information has to be reported.

2. The method as claimed in claim 1, wherein the reception power of the signal of the communication system that generates the ICO is a value of reception power intensity of a signal of the communication system that generates the ICO, received within the band of the wireless communication system of the UE, which is measured based on a signal measurement method operating in the wireless communication system of the UE.

3. The method as claimed in claim 2, wherein the value of the reception power intensity of the signal of the communication system that generates the ICO is represented in a Reference Signal Received Power range.

4. The method as claimed in claim 1, wherein the reception power of the signal of the communication system that generates the ICO is a value of the reception power intensity of a signal of the communication system that generates the ICO, received within the band of the wireless communication system of the UE, to the reception power intensities of all signals received within the band of the wireless communication system of the UE, which is measured based on a signal measurement method operating in the wireless communication system of the UE.

5. The method as claimed in claim 4, wherein the value of the reception power intensity of the signal of the communication system that generates the ICO is represented in a Reference Signal Received Quality range.

6. The method as claimed in claim 1, wherein the communication system that generates the ICO includes Wireless Local Area Network system, Bluetooth system, or Global Positioning system.

7. The method as claimed in claim 1, wherein the RLF report includes an indicator indicating whether there is an influence of ICO of the UE to the RLF.

8. The method as claimed in claim 1, wherein the measured value of reception power or interference power of the signal of the communication system that generates the ICO is measured based on a measurement method which is configured to perform Minimization Driving Test.

9. The method as claimed in claim 1, wherein the RLF report is included in a Radio Resource Control (RRC) connection re-establishment request message and then transmitted, in an RRC connection re-establishment procedure performed after the RLF.

10. A User Equipment (UE) to report a Radio Link Failure (RLF) in a wireless communication system, the UE comprising:
- a processor including a control unit to detect an RLF and to configure an RLF report which comprises information indicating which communication system is the communication system that generates an In-device COexistence interference (ICO) if there is an influence of the ICO of the UE to the RLF, and a measurement unit to measure a value of reception power or interference power of a signal of the communication system that generates the ICO; and
- a Radio Frequency (RF) unit to transmit the RLF report to an eNodeB (eNB),
- wherein the RLF report is transmitted as a response to a UE information request received from an Evolved-Universal Terrestrial Radio Access Network (E-UTRAN),
- a message including the UE information request includes a field to request RLF information, and
- the field to request the RLF information is a field to instruct a report of logged measurement information or a field to indicate whether the RLF information has to be reported.

11. The UE as claimed in claim 10, wherein the reception power of the signal of the communication system that generates the ICO is a value of reception power intensity of a signal of the communication system that generates the ICO, received within the band of the wireless communication system of the UE, which is measured based on a signal measurement method operating in the wireless communication system of the UE.

12. The UE as claimed in claim 11, wherein the value of the reception power intensity of the signal of the communication system that generates the ICO is represented in a Reference Signal Received Power range.

13. The UE as claimed in claim 10, wherein the reception power of the signal of the communication system that generates the ICO is a value of the reception power intensity of a signal of the communication system that generates the ICO, received within the band of the wireless communication system of the UE, to the reception power intensities of all signals received within the band of the wireless communication system of the UE, which is measured based on a signal measurement method operating in the wireless communication system of the UE.

14. The UE as claimed in claim 13, wherein the value of the reception power intensity of the signal of the communication system that generates the ICO is represented in a Reference Signal Received Quality range.

15. The UE as claimed in claim 10, wherein the communication system that generates the ICO includes Wireless Local Area Network system, Bluetooth system, or Global Positioning system.

16. The UE as claimed in claim 10, wherein the RLF report includes an indicator indicating whether there is an influence of ICO of the UE to the RLF.

17. The UE as claimed in 10, wherein the measured value of reception power or interference power of the signal of the communication system that generates the ICO is measured based on a measurement method which is configured to perform Minimization Driving Test.

18. The UE as claimed in claim 10, wherein the RLF report is included in a Radio Resource Control (RRC) connection re-establishment request message and then transmitted, in an RRC connection re-establishment procedure performed after the RLF.

* * * * *